US011121822B2

United States Patent
Cho et al.

(10) Patent No.: US 11,121,822 B2
(45) Date of Patent: Sep. 14, 2021

(54) HYBRID AUTOMATIC REPEAT REQUEST (HARQ) WITH BASIC SERVICE SET (BSS) AND STATION IDENTIFICATION

(71) Applicant: QUALCOMM Incorporated, San Diego, CA (US)

(72) Inventors: James Simon Cho, Mountain View, CA (US); Tao-Fei Samuel Ng, Fremont, CA (US); Youhan Kim, Saratoga, CA (US); Bin Tian, San Diego, CA (US); Jialing Li Chen, San Diego, CA (US); Stephen Jay Shellhammer, Ramona, CA (US); Vincent Knowles Jones, IV, Redwood City, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 19 days.

(21) Appl. No.: 16/668,769

(22) Filed: Oct. 30, 2019

(65) Prior Publication Data

US 2021/0135792 A1    May 6, 2021

(51) Int. Cl.
*H04L 1/18* (2006.01)
*H04W 84/12* (2009.01)

(52) U.S. Cl.
CPC .......... *H04L 1/1812* (2013.01); *H04L 1/1893* (2013.01); *H04W 84/12* (2013.01)

(58) Field of Classification Search
CPC ... H04L 1/1812; H04L 1/1819; H04L 1/1893; H04W 74/0816; H04W 80/02; H04W 84/12
See application file for complete search history.

(56) References Cited

U.S. PATENT DOCUMENTS

| 8,369,257 B2 * | 2/2013 | Chu ................. H04W 74/0816 |
| | | 370/312 |
| 8,391,259 B2 * | 3/2013 | Chu ..................... H04W 16/14 |
| | | 370/338 |

(Continued)

FOREIGN PATENT DOCUMENTS

| BR | 112018075006 A2 * | 3/2019 | ............. H04W 48/08 |
| CA | 3024319 A1 * | 12/2017 | ........ H04W 52/0212 |

(Continued)

OTHER PUBLICATIONS

Stacey, Specification Framework for TGax, Dec. 7, 2015, IEEE, IEEE P802.11—Task Group AX, doc.: IEEE 802.11-15/0132r13 (Year: 2015).*

(Continued)

*Primary Examiner* — Eric Nowlin
(74) *Attorney, Agent, or Firm* — DeLizio Law, PLLC

(57) ABSTRACT

This disclosure provides systems, methods, and apparatus, including computer programs encoded on computer-readable media, for implementing a hybrid automatic repeat request (HARQ) protocol in a wireless local area network (WLAN). A first WLAN device may generate a first HARQ packet for transmission to a second WLAN device. The first WLAN device may determine a first basic service set (BSS) indicator and a second BSS indicator for a BSS associated with the first WLAN device and the second WLAN device. The first BSS indicator and the second BSS indicator may be indicative of a BSS identifier (BSSID) of the BSS. The first WLAN device may output the first HARQ packet for transmission to the second WLAN device. The first HARQ packet may include the first BSS indicator and the second BSS indicator in one or more fields of a physical layer (PHY) header of the first HARQ packet.

28 Claims, 15 Drawing Sheets

(56) References Cited

U.S. PATENT DOCUMENTS

| | | | |
|---|---|---|---|
| 8,625,570 B2* | 1/2014 | Chu | H04L 12/43 370/349 |
| 9,078,145 B2 | 7/2015 | Issakov et al. | |
| 9,538,525 B2* | 1/2017 | Chu | H04L 12/43 |
| 10,111,167 B2* | 10/2018 | Zhou | H04L 61/6022 |
| 10,366,064 B2* | 7/2019 | Cariou | H04B 7/0413 |
| 10,397,928 B1 | 8/2019 | Hahn | H04L 41/12 |
| 10,433,345 B2* | 10/2019 | Kim | H04W 72/0446 |
| 10,470,128 B2* | 11/2019 | Noh | H04L 27/2602 |
| 10,674,513 B2* | 6/2020 | Hahn | H04W 16/18 |
| 10,764,925 B2* | 9/2020 | Li | H04W 48/08 |
| 10,785,795 B2* | 9/2020 | Son | H04W 52/50 |
| 10,841,961 B2* | 11/2020 | Kim | H04W 72/0446 |
| 10,873,973 B2* | 12/2020 | Ko | H04W 40/00 |
| 2008/0009243 A1 | 1/2008 | Hart | |
| 2009/0213776 A1* | 8/2009 | Chu | H04W 16/14 370/312 |
| 2010/0165907 A1* | 7/2010 | Chu | H04L 12/1868 370/312 |
| 2010/0165963 A1* | 7/2010 | Chu | H04W 72/0446 370/338 |
| 2012/0258733 A1 | 10/2012 | Fischer et al. | |
| 2014/0016621 A1 | 1/2014 | Zhang et al. | |
| 2014/0119268 A1* | 5/2014 | Chu | H04W 72/0446 370/312 |
| 2015/0296359 A1 | 10/2015 | Edge | |
| 2015/0365790 A1 | 12/2015 | Edge et al. | |
| 2016/0345258 A1* | 11/2016 | Zhou | H04W 48/16 |
| 2017/0142659 A1* | 5/2017 | Noh | H04W 52/0245 |
| 2017/0201926 A1 | 7/2017 | Krendzel et al. | |
| 2017/0230149 A1* | 8/2017 | Wang | H04L 1/1819 |
| 2017/0255659 A1* | 9/2017 | Cariou | H04B 7/0413 |
| 2017/0359300 A1* | 12/2017 | Patil | H04L 61/1541 |
| 2018/0054818 A1* | 2/2018 | Kakani | H04W 72/0446 |
| 2018/0098314 A1 | 4/2018 | Rico Alvarino et al. | |
| 2018/0098378 A1* | 4/2018 | Patil | H04W 88/10 |
| 2018/0110046 A1* | 4/2018 | Patil | H04W 52/0219 |
| 2018/0184285 A1* | 6/2018 | Patil | H04L 61/2038 |
| 2018/0235002 A1* | 8/2018 | Son | H04L 69/22 |
| 2018/0270038 A1* | 9/2018 | Oteri | H04L 5/0037 |
| 2018/0343677 A1* | 11/2018 | Li | H04W 24/02 |
| 2018/0359779 A1* | 12/2018 | Kim | H04W 74/085 |
| 2019/0014561 A1 | 1/2019 | Takeda | |
| 2019/0021091 A1* | 1/2019 | Ko | H04W 72/0453 |
| 2019/0037338 A1 | 1/2019 | Edge et al. | |
| 2019/0082387 A1* | 3/2019 | Kim | H04W 52/0206 |
| 2019/0090092 A1 | 3/2019 | Hwang et al. | |
| 2019/0132872 A1* | 5/2019 | Ko | H04L 47/824 |
| 2019/0373634 A1* | 12/2019 | Kim | H04W 72/0446 |
| 2019/0380056 A1 | 12/2019 | Lee et al. | |
| 2020/0045637 A1* | 2/2020 | Noh | H04W 52/0245 |
| 2020/0052832 A1* | 2/2020 | Tian | H04L 1/0009 |
| 2020/0059932 A1* | 2/2020 | Hahn | H04L 41/12 |
| 2020/0137674 A1* | 4/2020 | Aio | H04W 74/0816 |
| 2020/0137715 A1 | 4/2020 | Edge et al. | |
| 2020/0154240 A1 | 5/2020 | Edge et al. | |
| 2020/0221545 A1* | 7/2020 | Stacey | H04W 88/10 |
| 2020/0236134 A1* | 7/2020 | Bhanage | H04L 63/1458 |
| 2020/0267508 A1 | 8/2020 | Fischer et al. | |
| 2020/0280399 A1* | 9/2020 | Kim | H04L 1/1819 |
| 2020/0288323 A1* | 9/2020 | Silverman | H04W 4/38 |
| 2020/0367280 A1* | 11/2020 | Son | H04B 7/26 |
| 2020/0367281 A1* | 11/2020 | Son | H04B 7/26 |
| 2020/0413445 A1* | 12/2020 | Seok | H04L 5/0053 |
| 2020/0413446 A1* | 12/2020 | Seok | H04L 5/0053 |
| 2021/0006360 A1* | 1/2021 | Asterjadhi | H04L 1/1812 |
| 2021/0006361 A1* | 1/2021 | Asterjadhi | H04W 80/02 |
| 2021/0014692 A1* | 1/2021 | Cherian | H04W 16/10 |
| 2021/0099253 A1* | 4/2021 | Kim | H04L 1/1812 |
| 2021/0099256 A1* | 4/2021 | Lee | H04L 1/1819 |

FOREIGN PATENT DOCUMENTS

| | | | |
|---|---|---|---|
| CN | 109314911 A * | 2/2019 | H04W 48/16 |
| EP | 3243292 A1 * | 11/2017 | H04L 5/0073 |
| EP | 3451744 A2 * | 3/2019 | H04W 72/0446 |
| EP | 3451745 A1 * | 3/2019 | H04W 52/0216 |
| EP | 3469833 A1 * | 4/2019 | H04W 24/02 |
| EP | 3451745 A4 * | 9/2019 | H04W 52/0219 |
| EP | 3451744 A4 * | 12/2019 | H04W 72/0446 |
| EP | 3243292 B1 * | 3/2020 | H04W 72/082 |
| EP | 3687101 A1 * | 7/2020 | H04L 5/0094 |
| JP | 6599994 B2 * | 10/2019 | H04L 5/0037 |
| KR | 20180100064 A * | 9/2018 | H04W 52/0229 |
| KR | 20190018138 A * | 2/2019 | H04W 48/08 |
| KR | 101962150 B1 * | 3/2019 | H04W 74/085 |
| WO | 2015192113 | 12/2015 | |
| WO | WO-2016112306 A1 * | 7/2016 | H04L 5/0073 |
| WO | 2017196510 | 11/2017 | |
| WO | WO-2017188712 A2 * | 11/2017 | H04W 52/0229 |
| WO | WO-2017188713 A1 * | 11/2017 | H04W 52/0216 |
| WO | WO-2017218556 A1 * | 12/2017 | H04W 48/16 |
| WO | WO-2018075226 A1 * | 4/2018 | H04W 72/0446 |
| WO | WO-2017188712 A3 * | 8/2018 | H04W 74/085 |
| WO | 2019027540 | 7/2019 | |
| WO | WO-2019182421 A1 * | 9/2019 | H04L 27/26 |
| WO | 2020073644 | 4/2020 | |
| WO | WO-2020097441 A1 * | 5/2020 | H04L 1/08 |

OTHER PUBLICATIONS

Inoue et al., Number of BSS Color bits, Sep. 14, 2015, IEEE, IEEE P802.11—Task Group AX, doc.: IEEE 802.11-15/1075r1 (Year: 2015).*

Asterjadhi et al., Identifiers in HE PPDUs for power saving, Sep. 12, 2015, IEEE, IEEE P802.11—Task Group AX, doc.: IEEE 802.11-15/1122r0 (Year: 2015).*

Khorovetal., Multiple NAVs for Spatial Reuse, Nov. 9, 2015, IEEE, IEEE P802.11—Task Group AX, doc.: IEEE 802.11-15/1348 (Year: 2015).*

Ko et al., BSS Color Settings for a Multiple BSSID Set, Jan. 18, 2016, IEEE, IEEE P802.11—Task Group AX, doc.: IEEE 802.11-16/0042r2 (Year: 2016).*

Wang et al., CR for BSS Color Related CIDs Part 2, Nov. 8, 2019, IEEE, IEEE P802.11—Task Group AX, CR for CID 4060 and 4122CR for CID 4060 and 41221977r1 (Year: 2019).*

"3rd Generation Partnership Project, Technical Specification Group Radio Access Network, NG-RAN, Architecture Description (Release 15)", Jan. 3, 2019, 40 pages.

Qualcomm Incorporated, "Combined Downlink and Uplink NR Positioning Procedures", Nov. 2, 2018, 18 pages.

Qualcomm Incorporated, "Local NR Positioning in NG-RAN", Aug. 16, 2019, 32 pages.

Qualcomm Incorporated, "NG-RAN Positioning Architecture and Procedures", Feb. 15, 2019, 10 pages.

Qualcomm Incorporated, "NG-RAN Positioning Architecture and Procedures", Nov. 12, 2018, 17 pages.

Qualcomm Incorporated, "On Demand Transmission of PRS for NR", Nov. 12, 2018, 27 pages.

Trueposition, "UTDOA Architecture Options", May 3, 2011, 9 pages.

* cited by examiner

HYBRID AUTOMATIC REPEAT REQUEST (HARQ) WITH BASIC SERVICE SET (BSS) AND STATION IDENTIFICATION

TECHNICAL FIELD

This disclosure relates to the field of wireless communication, and more particularly to implementing a hybrid automatic repeat request (HARQ) feature in a wireless local area network (WLAN).

DESCRIPTION OF THE RELATED TECHNOLOGY

A wireless local area network (WLAN) may be formed by two or more WLAN devices (which may be referred to as stations (STAs)) that share a wireless communication medium using common service settings. One or more of the WLAN devices (which may be referred to as an access point (AP)) may establish the common service settings. An AP is a type of STA that performs a distribution system access function in the WLAN. The basic building block of a WLAN conforming to the Institute of Electrical and Electronics Engineers (IEEE) 802.11 family of standards is a basic service set (BSS), which is managed by an AP. An AP is a type of WLAN device that performs a distribution system access function in the WLAN. Each BSS is identified by a BSS identifier (BSSID) that is advertised by the AP. An AP periodically broadcasts beacon frames to enable any STAs within wireless range of the AP to establish or maintain a communication link with the WLAN.

A wireless communication between two WLAN devices (which may be referred to as a sending STA and a receiving STA) may be susceptible to interference or other challenges which impair the wireless communication medium. A wireless transmission from a sending STA may include error checking and redundancy information that enables a receiving STA to discover or correct errors in the wireless transmission. If the errors cannot be corrected, the receiving STA may request the data to be retransmitted by the sending STA. For example, the receiving STA may send a feedback message (including an acknowledgment or negative acknowledgment) to indicate whether the data was successfully received. The receiving STA and the sending STA may utilize a traditional retransmission protocol.

SUMMARY

The systems, methods, and devices of this disclosure each have several innovative aspects, no single one of which is solely responsible for the desirable attributes disclosed herein.

One innovative aspect of the subject matter described in this disclosure can be implemented by a wireless communication device of a first wireless local area network (WLAN) device that supports a hybrid automatic repeat request (HARQ) protocol. The method may include generating a first HARQ packet for transmission to a second WLAN device. The method may include determining a first basic service set (BSS) indicator and a second BSS indicator for a BSS associated with the first WLAN device and the second WLAN device. The first BSS indicator and the second BSS indicator may be indicative of a BSS identifier (BSSID) of the BSS. The method may include outputting the first HARQ packet for transmission to the second WLAN device. The first HARQ packet may include the first BSS indicator and the second BSS indicator in one or more fields of a physical layer (PHY) header of the first HARQ packet.

In some implementations, a combination of the first BSS indicator and the second BSS indicator is indicative of the BSSID of the BSS associated with first WLAN device and the second WLAN device.

In some implementations, the first BSS indicator is a BSS color and the second BSS indicator is a BSS color extension.

In some implementations, the first BSS indicator is included in a first field of the PHY header and the second BSS indicator is included in a second field of the PHY header.

In some implementations, the first field is a SIG-A field of the PHY header and the second field is a SIG-B field of the PHY header.

In some implementations, the first field is a Hybrid SIG field of the PHY header and the second field is a SIG-A field or a SIG-B field of the PHY header.

In some implementations, the first BSS indicator and the second BSS indicator are included in a first field of the PHY header.

In some implementations, the first field is a SIG-A field, a SIG-B field, or a Hybrid SIG field of the PHY header.

In some implementations, the first BSS indicator and the second BSS indicator form a single BSSID indicator included in the first field of the PHY header.

In some implementations, the first BSS indicator includes a plurality of bits and the second BSS indicator includes a plurality of bits, and determining the first BSS indicator and the second BSS indicator may include one of determining values for the first BSS indicator and the second BSS indicator randomly, determining values for the first BSS indicator and the second BSS indicator based on values that have not been selected by other BSSs in an overlapping BSS (OBSS), or determining values for the first BSS indicator and the second BSS indicator using at least a portion of the BSSID of the BSS.

In some implementations, the method may include obtaining a HARQ feedback message from the second WLAN device after the second WLAN device confirms that the BSS associated with the BSSID that is indicated by the first BSS indicator and the second BSS indicator is the same BSS that is associated with the second WLAN device.

In some implementations, the first WLAN device is an access point (AP) and the second WLAN device is a station (STA).

Another innovative aspect of the subject matter described in this disclosure can be implemented by a wireless communication device of a first WLAN device that supports a HARQ protocol. The method may include obtaining a first HARQ packet from a second WLAN device, and determining a first BSS indicator and a second BSS indicator included in one or more fields of a PHY header of the first HARQ packet. The method may include determining a first BSSID based, at least in part, on the first BSS indicator and the second BSS indicator. The method may include determining whether the first BSSID matches a BSSID of a BSS associated with the first WLAN device. The method may include processing the first HARQ packet and communicating with the second WLAN device in response to determining the first BSSID matches the BSSID of the BSS associated with the first WLAN device.

In some implementations, the method may include discarding the first HARQ packet in response to determining the first BSSID does not match the BSSID of the BSS associated with the first WLAN device.

In some implementations, a combination of the first BSS indicator and the second BSS indicator is indicative of the BSSID of the BSS associated with first WLAN device and the second WLAN device.

In some implementations, the first BSS indicator is a BSS color and the second BSS indicator is a BSS color extension.

In some implementations, the first BSS indicator is included in a first field of the PHY header and the second BSS indicator is included in a second field of the PHY header.

In some implementations, the method may include generating a HARQ feedback message for transmission to the second WLAN device in response to determining the first BSSID matches the BSSID of the BSS associated with the first WLAN device.

In some implementations, the method may include determining a first station identifier (STA ID) included in the PHY header of the first HARQ packet, and determining whether the first STA ID matches a STA ID associated with the first WLAN device. The method may include processing the first HARQ packet and communicating with the second WLAN device in response to determining the first BSSID matches the BSSID of the BSS associated with the first WLAN device and determining the first STA ID matches the STA ID associated with the first WLAN device.

Another innovative aspect of the subject matter described in this disclosure can be implemented by a wireless communication device of a first WLAN device that supports a HARQ protocol. The method may include generating a non-HARQ message for transmission to a second WLAN device. The non-HARQ message may include a BSSID and a HARQ setup indicator that indicates the first WLAN device will transmit one or more HARQ packets to the second WLAN device after the non-HARQ message. The method may include outputting the non-HARQ message for transmission to the second WLAN device. The non-HARQ message may include the BSSID and the HARQ setup indicator. The method may include outputting a first HARQ packet for transmission to the second WLAN device after the transmission of the non-HARQ message.

In some implementations, the non-HARQ message is a HARQ setup message that schedules the one or more HARQ packets with the second WLAN device and provides the BSSID to the second WLAN device in advance of the first HARQ packet.

In some implementations, the HARQ setup indicator is a bit, field, or sub-field in a PHY header or a MAC header of the non-HARQ message.

In some implementations, the non-HARQ message is a scheduled non-HARQ data transmission that is adapted to include both the HARQ setup indicator that is intended for the second WLAN device and data that is intended for the second WLAN device or for another WLAN device.

In some implementations, the HARQ setup indicator is a HARQ setup packet and the data is a data packet. The HARQ setup packet may be used for scheduling the one or more HARQ packets with the second WLAN device and providing the BSSID to the second WLAN device in advance of the first HARQ packet.

In some implementations, outputting the first HARQ packet for transmission to the second WLAN device may include outputting the first HARQ packet a short interframe space (SIFS) time period after the transmission of the non-HARQ message.

Another innovative aspect of the subject matter described in this disclosure can be implemented by a wireless communication device of a first WLAN device that supports a HARQ protocol. The method may include obtaining a non-HARQ message from a second WLAN device. The non-HARQ message may include a first BSSID and a HARQ setup indicator. The method may include determining whether the first BSSID matches a BSSID of a BSS associated with the first WLAN device, processing the non-HARQ message in response to determining the first BSSID matches the BSSID of the BSS associated with the first WLAN device, determining that the HARQ setup indicator indicates the second WLAN device will transmit one or more HARQ packets to the first WLAN device after the non-HARQ message, and obtaining a first HARQ packet from the second WLAN device after receiving the non-HARQ message.

In some implementations, obtaining the first HARQ packet from the second WLAN device may include obtaining the first HARQ packet a SIFS time period after a reception of the non-HARQ message.

Another innovative aspect of the subject matter described in this disclosure can be implemented by a wireless communication device of a first WLAN device that supports a HARQ protocol. The method may include obtaining a first HARQ packet from a second WLAN device, and processing, by a PHY layer of the wireless communication device, a PHY preamble and a PHY header of the first HARQ packet. The method may include determining, by the PHY layer, whether a delimiter of a media access control (MAC) protocol data unit (MPDU) of the first HARQ packet is detected, and determining, by the PHY layer, whether a MAC header associated with the delimiter of the MPDU can be decoded in response to determining the delimiter is detected. The method may include determining, by the PHY layer, whether the first HARQ packet is intended for the first WLAN device in response to determining the MAC header can be decoded, and processing the first HARQ packet and communicating with the second WLAN device in response to determining the first HARQ packet is intended for the first WLAN device.

In some implementations, the method may include determining, by the PHY layer, a first BSSID included in the MAC header in response to determining the MAC header can be decoded, and determining, by the PHY layer, whether the first BSSID matches a BSSID of a BSS associated with the first WLAN device. The method may include determining, by the PHY layer, that the first HARQ packet is intended for the first WLAN device in response to determining the first BSSID matches the BSSID of the BSS, and processing the first HARQ packet and communicating with the second WLAN device in response to determining the first BSSID matches the BSSID of the BSS.

Another innovative aspect of the subject matter described in this disclosure can be implemented in a wireless communication device that includes a processing system and a first interface. At least one of the processing system and the first interface may be configured to perform any of the above-mentioned methods.

Another innovative aspect of the subject matter described in this disclosure can be implemented in an apparatus that includes the above-mentioned wireless communication device that is configured to perform any of the above-mentioned methods.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following Figures may not be drawn to scale.

BRIEF DESCRIPTION OF THE DRAWINGS

Like reference numbers and designations in the various drawings indicate like elements.

DETAILED DESCRIPTION

Figure 1:
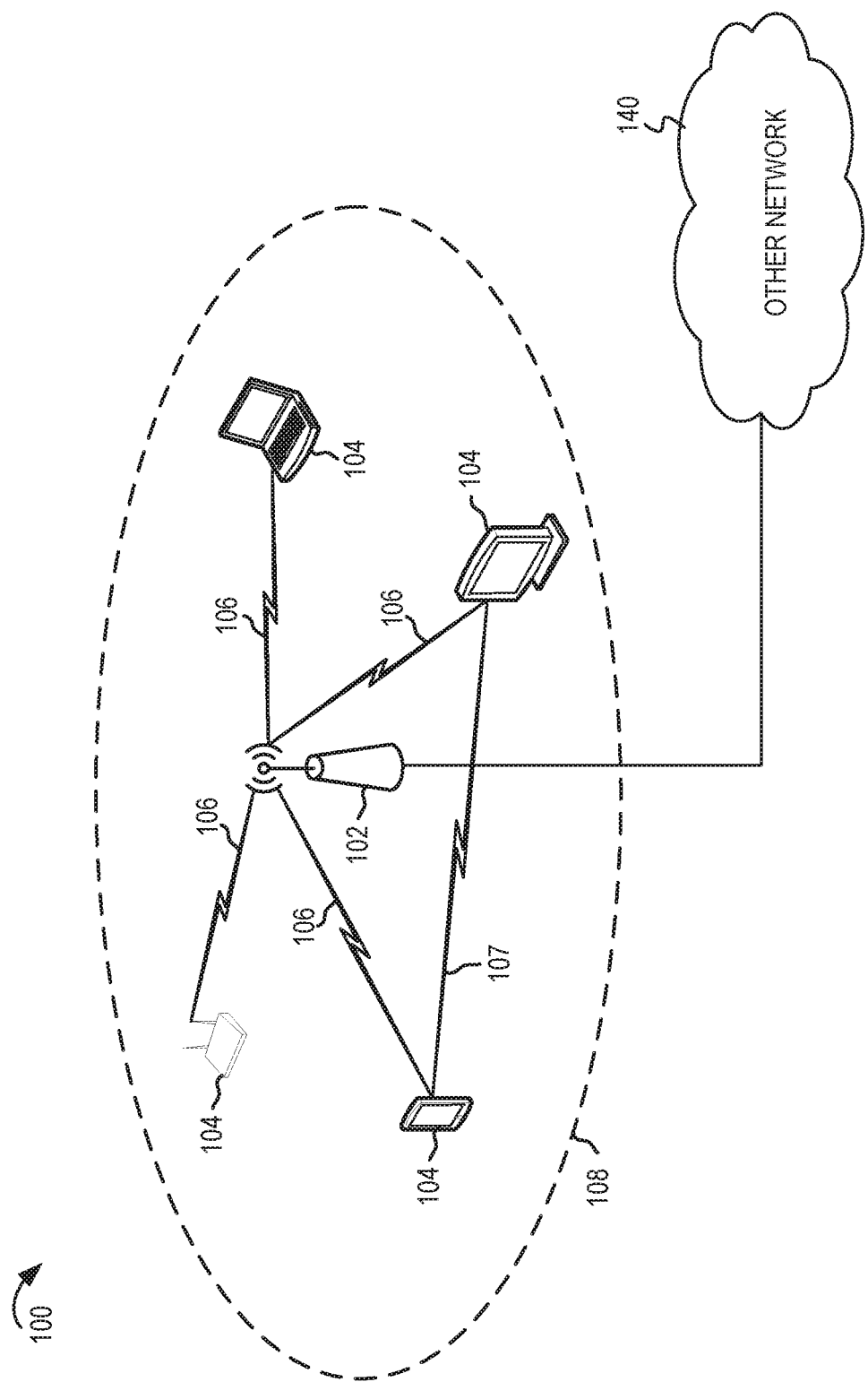
FIG. 1 shows a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other area may include one or more WLAN devices. Each WLAN device may have a station (STA) interface which is an addressable entity that shares a wireless communication medium with other STAs. An AP is a type of STA that performs a distribution system access function in the WLAN. WLAN devices may be referred to as STAs, regardless of whether the WLAN device is an AP or a non-AP STA. For brevity, the examples of this disclosure refer to a first WLAN device (acting as a sending STA) that communicates data to a second WLAN device (acting as a receiving STA). Due to the nature of wireless communication, the WLAN devices may implement a retransmission protocol to improve reliable delivery of a media access control (MAC) protocol data unit (MPDU) or to improve the overall throughput from the first WLAN device to the second WLAN device. A physical convergence layer (PHY) protocol data unit (PPDU) may include one or more MPDUs. For example, one type of PPDU (referred to as an Aggregated MPDU, or A-MPDU) may include multiple MPDUs in a payload of the A-MPDU. A PPDU also may be referred to as a packet or a frame in some aspects of this disclosure. In some implementations, a PPDU may contain an MPDU or an A-MPDU that is addressed to a receiver.

A traditional retransmission protocol (which may be referred to as a baseline approach, or as automatic repeat request (ARQ)) may use a first type of feedback message that includes an acknowledgment (ACK). In some implementations, the absence of an ACK may be interpreted as a negative acknowledgment (NACK). For example, the first type of feedback message may be referred to as a traditional ACK message type. A receiving STA may send a traditional ACK message to the sending STA to indicate whether the receiving STA has successfully received the packet. If the sending STA does not receive a traditional ACK message (such as by an expected time) in response to a packet, the sending STA may retransmit the original packet. In some implementations, the sending STA may retransmit the packet with a lower data rate compared to the initial transmission to increase the likelihood of reception of the packet.

Hybrid automatic repeat request (hybrid ARQ or HARQ) is another retransmission protocol. HARQ has previously been used in wide area wireless communication systems. HARQ uses a combination of error detection and error correction. A HARQ transmission may include error checking bits that are added to data to be transmitted using an error-detecting (ED) code, such as a cyclic redundancy check (CRC). The error checking bits may be used by a receiving STA to determine if it has properly decoded the received HARQ transmission. Additionally, the HARQ transmission may utilize an error correction technique. For example, the original data may be encoded with a forward error correction (FEC) code. Both original data and parity bits may be sent in the HARQ transmission. A receiving STA may be able to use the parity bits to correct errors in the transmission, thus avoiding a retransmission. The ED code may be omitted when encoding is used that can perform both FEC and ED, such as a Reed-Solomon (RS) code. Also, low-density parity check (LDPC) codes can perform error detection by checking the values of the parity bits, after convergence of the LDPC decoder.

Another feature of HARQ is that a receiving STA may combine a first HARQ transmission with a second HARQ transmission. For example, if the receiving STA cannot properly decode (and cannot correct the errors) the first HARQ transmission, the receiving STA may send a HARQ feedback message that indicates at least part of the first HARQ transmission was not properly decoded. The HARQ feedback message is another type of feedback message, different from the traditional ACK/NACK feedback message type (which also may be referred to as non-HARQ feedback message type). In response to receiving the HARQ feedback message, the sending STA may transmit a second HARQ transmission to the receiving STA to communicate at least part of the first HARQ transmission that was not acknowledged. The combined HARQ transmissions may be processed for decoding and error correction. The receiving STA may combine the second HARQ transmission with the first HARQ transmission so that the complete signal associated with the HARQ transmissions can be decoded.

When a receiving STA processes a first HARQ transmission received from a sending STA, the receiving STA may use the MAC headers to determine whether the first HARQ transmission was intended for the receiving STA and whether it should generate a response. For example, the receiving STA may access the transmitter address (TA) and the receiver address (RA) in the MAC headers, or derive the TA and RA based on information in the MAC headers, to determine whether the first HARQ transmission was intended for the receiving STA and whether to respond to the sending STA. However, since HARQ transmissions typically use relatively high modulation and coding schemes (MCSs) and have high packet error rates (PERs), the address information in the MAC headers may be corrupted or may not be detectable. For example, the receiving STA may not be able to decode the TA and RA in the MAC headers due to the noise at reception of the first HARQ transmission. The PHY preamble and PHY header, which are processed by the PHY later, are typically transmitted using a low MCS, and thus usually have a substantially higher probability of being successfully received and decoded compared to the MAC headers. However, since the available space in the PHY header is highly limited and the RA and TA are each 48 bits wide, it may not be possible or practical to include the RA and TA in the PHY header. Instead of the RA and TA, the PHY header may include a hint of the identity of the receiving STA based on a station identifier (STA ID) and a basic service set (BSS) color. The STA ID is typically 12 bits, and the BSS color is typically 6 bits. Once a BSS identifier (BSSID) of the BSS is known, a 12-bit STA ID is typically sufficient to identity the receiving STA in the BSS. However, if the BSS is not known, collisions can occur if the 12-bit STA ID is reused by another BSS in an overlapping BSS (OBSS) environment. The 6-bit BSS color is typically sufficient to identify the BSSID of the BSS in settings that do not have OBSSs. However, since the BSS color is only 6 bits, collisions can occur in OBBS settings if two or more BSSs select the same BSS color. For example, an OBSS collision may occur when two or more receiving STAs from two or more BSSs (that used the same BSS color) send a response (such as an acknowledgement message) to the sending STA after receiving a HARQ transmission.

In some implementations, and for IEEE 802.11be communications, a sending STA may include additional information in the PHY header of a HARQ transmission to identify the BSS and the receiving STA. In some implementations, the sending STA may include a BSS color and a BSS color extension in one or more fields of the PHY header of a HARQ transmission. For example, the sending STA may include a BSS color in a first field (such as a SIG-A field) of the PHY header and a BSS color extension in a second field (such as a SIG-B field) of the PHY header. As another example, the sending STA may include both the BSS color and the BSS color extension in a single field (such as the SIG-A field or the SIG-B field) of the PHY header. In some implementations, the BSS color may be included in the SIG-A field of the PHY header of HARQ transmissions in order to be backward compatible with IEEE 802.11ax protocols. For example, the SIG-A field may include a 6-bit BSS color as defined by IEEE 802.11ax. As described previously, in an OBSS setting, using solely the BSS color to identify the BSS may cause OBSS collisions. In some implementations, the PHY header of HARQ transmissions also may include a BSS color extension in order to provide additional bits to identify the BSS and the receiving STA using the information in the PHY header. In some implementations, the combination or concatenation of the bits of the BSS color and the BSS color extension may be used to identify the BSSID of the BSS with a very low probability of OBSS collisions. After identifying the BSSID of the BSS based on the BSS color and the BSS color extension, the STA ID in the PHY header can be used to identify the receiving STA of the BSS. The BSS color extension may be generally referred to as a BSS indicator or a BSS identifier, which adds additional bits to the PHY header for use by a receiving STA in identifying the BSSID of the BSS associated with the sending STA.

In some implementations, the sending STA may schedule a non-HARQ transmission, prior to the HARQ transmission, to identify the BSS and the receiving STA. In some implementations, the non-HARQ transmission may be a scheduling or setup transmission that is provided to the receiving STA to indicate a sequence of HARQ transmissions will be sent to the receiving STA following the non-HARQ transmission. The non-HARQ transmission may include at least the TA, the RA, and the BSSID of the BSS associated with the sending STA. For example, the non-HARQ transmission may include a MAC header, which includes at least the TA, the RA, and the BSSID of the BSS associated with the sending STA. Since the non-HARQ transmission is typically transmitted using a relatively low MCS, the receiving STA may detect and successfully decode the MAC header. The receiving STA may determine the RA and BSSID included in the non-HARQ transmission. The receiving STA may determine whether the received RA matches the address of the receiving STA and whether the received BSSID matches the BSSID of the BSS associated with the receiving STA. If the addresses and BSSIDs match, then this may serve as confirmation that the receiving STA is the intended receiver of the sequence of HARQ transmissions that will follow the non-HARQ transmission. In some implementations, the non-HARQ transmission may include both a scheduling or setup indicator intended for the receiving STA, and regular data that is intended for either the receiving STA or another STA. The scheduling or setup indicator may indicate a sequence of HARQ transmissions will be sent to the receiving STA after the non-HARQ transmission. Thus, the scheduling or setup indicator may be included as part of a scheduled non-HARQ data transmission in order to limit the overhead.

In some implementations, instead of waiting for the MAC layer of the receiving STA to process the MAC headers of a received HARQ transmission, the PHY layer of the receiving STA may decode the MAC headers and extract the BSSID to determine the BSS and STA information of the intended recipient of the HARQ transmission. In some implementations, the PHY layer of the receiving STA may search for one or more starting delimiters and may attempt to decode the first MPDU header. The PHY layer of the receiving STA also may attempt to validate a frame check sequence (FCS). If the first MPDU header is decoded and the FCS is validated, the PHY layer may determine the BSSID from the MAC header. The PHY layer may then use the BSSID to identify the BSS and the receiving STA in a similar manner as described herein. In some implementations, if the one or more starting delimiters are found and the first MPDU header is decoded, but the FCS is not validated, the BSSID may still be used to determine whether the receiving STA is the intended recipient of the HARQ transmission. For example, if the BSSID that is included in the MAC header of the received HARQ transmission matches with the BSSID of the BSS associated with the receiving STA, then there is a very high likelihood that the receiving STA is the intended recipient. In some implementations, even if the first MPDU header fails to decode, some intermediate code words may be validated. If the BSSID can be extracted from the validated code words, then it may be possible to confirm whether or not the receiving STA is the intended recipient.

Particular implementations of the subject matter described in this disclosure can be implemented to realize one or more of the following potential advantages. Implementing a HARQ retransmission protocol in a WLAN may improve the reliability of data communicated between a sending STA to a receiving STA. The features described herein for the HARQ retransmission protocol may allow a receiving STA to quickly and efficiently determine whether the receiving STA is the intended recipient. The features described herein for the HARQ retransmission protocol also may avoid OBSS collisions, and thus may help prevent unnecessary retransmissions and minimize overhead traffic. For example, without the features described herein for the HARQ retransmission protocol, OBSS collisions may result in the restart of the HARQ process, which may lower the throughput and increase latency. Also, the PHY rate may need to be lowered to make the MAC header reception more reliable, which effectively reduces the improvement in throughput that is gained by implementing the HARQ process. The HARQ retransmission protocol described herein for IEEE 802.11be communications also may be backward compatible with IEEE 802.11ax devices to provide support for both legacy and non-legacy devices.

FIG. 1 shows a system diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11aa, 802.11ah, 802.11ad, 802.11aq, 802.11ay, 802.11ax, 802.11az, 802.11ba and 802.11be). The WLAN 100 may include numerous wireless communication devices such as an access point (AP) 102 and multiple stations (STAs) 104 that have a wireless association with the AP 102. While only one AP 102 is shown, the WLAN network 100 also can include multiple APs 102. The IEEE 802.11-2016 standard defines a STA as an addressable unit. An AP is an entity that contains at least one STA and provides access via a wireless medium (WM) for associated STAs to access a distribution service (such as another network, not shown). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BSSID to enable any STAs 104 within wireless range of the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP. The AP 102 may provide access to external networks (such as the network 140) to various STAs 104 in the WLAN via respective communication links 106. To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 may assign an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 107. Additionally, two STAs 104 may communicate via a direct communication link 107 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 107 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs).

Each of the frequency bands may include multiple sub-bands or frequency channels. For example, PPDUs conforming to the IEEE 802.11n, 802.11ac, 802.11ax and 802.11be standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz, 80+80 MHz, 160 MHz, 160+160 MHz or 320 MHz by bonding together two or more 20 MHz channels, which can be contiguously allocated or non-contiguously allocated. For example, IEEE 802.11n describes the use of up to 2 channels (for a combined 40 MHz bandwidth) and defined a High Throughput (HT) transmission format. IEEE 802.11ac describes the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each PPDU is a composite structure that includes a PHY preamble, a PHY header, and a payload in the form of a PLCP service data unit (PSDU). For example, the PSDU may include the PHY preamble and header (which may be referred to as PLCP preamble and header) as well as one or more MAC protocol data units (MPDUs). The information provided in the PHY preamble and header may be used by a receiving device to decode the subsequent data in the PSDU. In instances in which PPDUs are transmitted over a bonded channel, the preamble and header fields may be duplicated and transmitted in each of the multiple component channels. The PHY preamble may be used for packet detection, automatic gain control and channel estimation, among other uses. The format of, coding of, and information provided in the PHY header is based on the particular IEEE 802.11 protocol to be used to transmit the payload, and typically includes signaling fields (such as SIG-A and SIG-B fields) that include BSS and addressing information, such as a BSS color and a STA ID.

Figure 2:
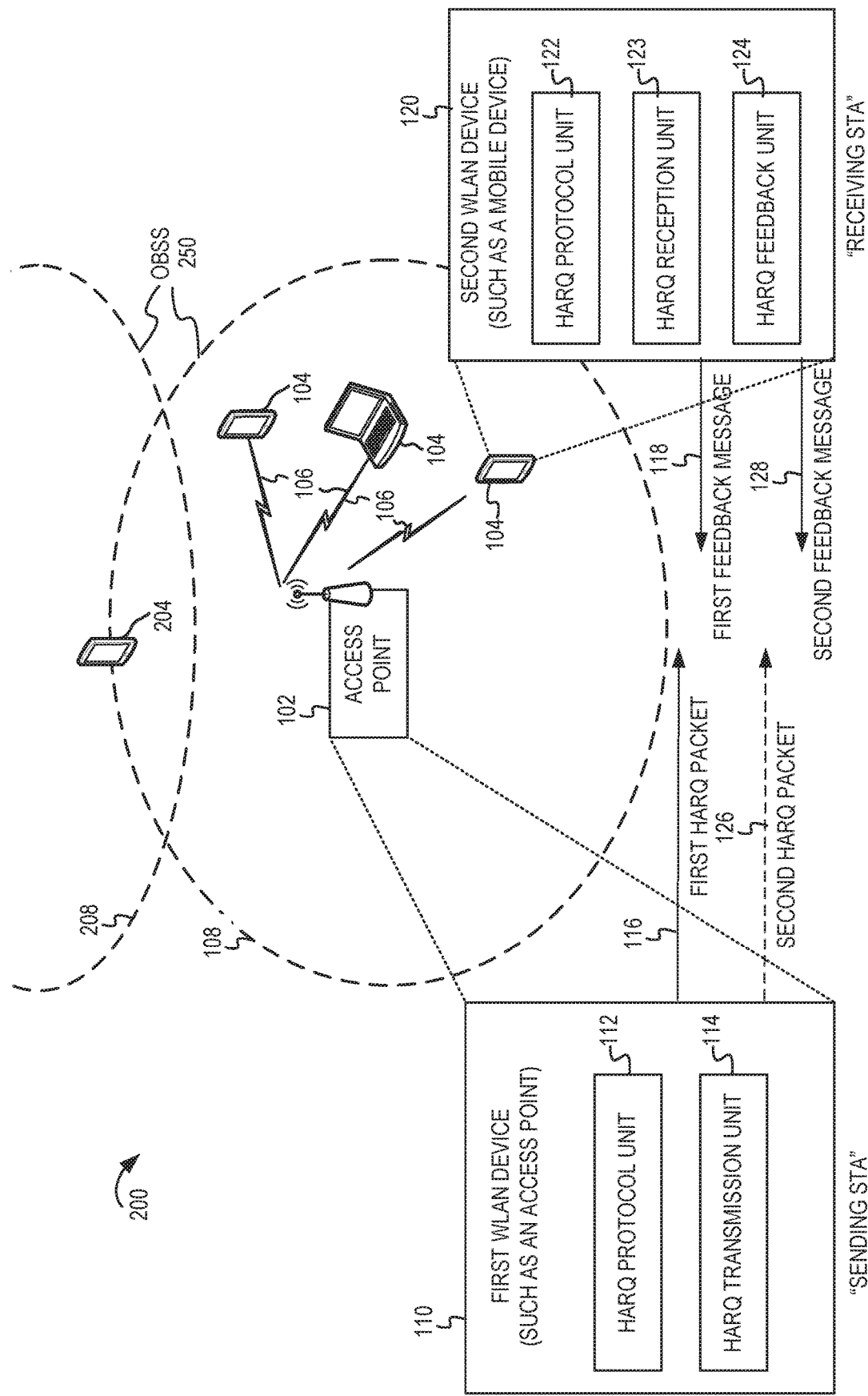
FIG. 2 depicts a system diagram of an example wireless local area network (WLAN) that implements a retransmission protocol, such as a hybrid automatic repeat request (HARQ) protocol.

FIG. 2 depicts a system diagram of an example WLAN 200 that implements a retransmission protocol, such as a hybrid automatic repeat request (HARQ) protocol. The WLAN 200 shown in FIG. 2 is based on the example WLAN described in FIG. 1. The AP 102 and the associated set of STAs 104 may form a first BSS, which may have a first coverage area 108. The AP 102 may be an example of a first WLAN device 110. Regardless of whether the first WLAN device 110 is an AP or a non-AP STA, it may be referred to as a "sending STA" for the example HARQ processes in this disclosure. The STAs 104 may be examples of the second WLAN device 120 and may be referred to as a "receiving STA" in the example HARQ processes in this disclosure. To be clear, the designations of sending STA and receiving STA may be reversed in other example HARQ processes.

A HARQ transmission may include multiple HARQ packets. In the example of FIG. 2, the first WLAN device 110 may send a first HARQ packet 116 to the second WLAN device 120, and the second WLAN device 120 may respond with a first feedback message 118. The first HARQ packet 116 may include initial transmissions of a first set of FEC codewords. Based on the first feedback message 118, the first WLAN device 110 may determine which FEC codewords from the first set of codewords had a decoding failure at the second WLAN device 120. The first WLAN device 110 may send a second HARQ packet 126 that may include retransmissions regarding the failed FEC codewords. The second WLAN device 120 may respond with a second feedback message 128, which may be a MAC-layer acknowledgement that follows the last HARQ packet of the HARQ process.

The first WLAN device 110 (as sending STA) may include a HARQ protocol unit 112 and a HARQ transmission unit 114. The HARQ protocol unit 112 may implement a HARQ protocol in accordance with aspects of this disclosure. The HARQ transmission unit 114 may prepare and communicate HARQ packets, such as the HARQ packets 116 and 126. The second WLAN device 120 (as receiving STA) may include a HARQ protocol unit 122, a HARQ reception unit 123 and a HARQ feedback unit 124. The HARQ protocol unit 122 may implement the HARQ protocol in accordance with aspects of this disclosure. The HARQ reception unit 123 may receive, decode, and process HARQ packets, such as the HARQ packets 116 and 126. The HARQ feedback unit 124 may prepare and communicate feedback messages, such as the feedback messages 118 and 128.

When the second WLAN device 120 processes the first HARQ packet 116, the second WLAN device 120 may attempt to extract the BSS and address information included in the MAC headers to determine whether the first HARQ packet 116 was intended for the second WLAN device 120 and whether to generate a feedback message (such as the first feedback message 118). However, since HARQ transmissions typically use relatively high modulation and coding schemes (MCSs) and have high packet error rates (PERs), the BSS and address information in the MAC headers may be corrupted or may not be detectable by the MAC layer of the second WLAN device 120. Even when the MAC headers are corrupted or not detectable, the PHY header is typically successfully received and decoded by the PHY layer, since the PHY header is usually sent using a relatively low MCS. The PHY header may include a hint of the identity of the receiving STA based on a station identifier (STA ID) and a BSS color. The STA ID is typically 12 bits, and the BSS color is typically 6 bits. Once the BSSID of the BSS is known or derived based on the BSS color, a 12-bit STA ID is typically sufficient to identity the receiving STA in the BSS. The 6-bit BSS color may be sufficient to identify the BSSID of the BSS in environments that do not have overlapping BSSs (OBSSs). However, since the BSS color is only 6 bits, collisions can occur in OBBS environments when two or more BSSs select the same BSS color. As shown in FIG. 2, a second BSS is formed by another AP (not shown) and one or more STAs, such as a STA 204. The first BSS and the second BSS result in an OBSS 250, as represented by the overlapping coverage areas 108 and 208. The WLAN 200 may include additional OBSSs that are not shown. An OBSS collision may occur when two or more receiving STAs from two or more BSSs (that used the same BSS color) send a response to the sending STA after receiving the HARQ transmission. For example, both the STA 204 and the second WLAN device 120 may receive the first HARQ packet 116 sent by the first WLAN device 110. If both the first BSS and the second BSS are using the same BSS color, both the STA 204 and the second WLAN device 120 may send a feedback message to the first WLAN device 110, which results in an OBSS collision.

In one aspect of this disclosure, for IEEE 802.11be communications, a sending STA may include additional information in the PHY header of a HARQ transmission to identify the BSS and the receiving STA. In some implementations, the sending STA may include a first BSS indicator (such as a BSS color) and a second BSS indicator (such as a BSS color extension) in one or more fields of the PHY header of a HARQ transmission. For example, the sending STA may include a BSS color in a first field (such as a SIG-A field) of the PHY header and a BSS color extension in a second field (such as a SIG-B field) of the PHY header. As another example, the sending STA may include both the BSS color and the BSS color extension in a single field (such as the SIG-A field or the SIG-B field) of the PHY header. In some implementations, the BSS color may be included in the SIG-A field of the PHY header of HARQ transmissions in order to be backward compatible with IEEE 802.11ax protocols. For example, the SIG-A field may include a 6-bit BSS color as defined by IEEE 802.11ax. As described in this disclosure, using solely the BSS color in an OBSS setting (such as the OBSS 250) to identify the BSS may cause OBSS collisions. In some implementations, the PHY header of HARQ transmissions also may include a second BSS indicator, such as a BSS color extension, in order to provide additional bits to identify the BSS and the receiving STA using the PHY header.

In some implementations, the combination or concatenation of the bits of the BSS color and the BSS color extension may be used to identify the BSSID of the BSS with a very low probability of OBSS collisions. The BSS color may be 6 bits wide (as defined in IEEE 802.11ax), and the BSS color extension may be one or more bits wide. In some implementations, the combined number of bits of the BSS color and the BSS color extension may be between 7 and 48 bits, since BSSIDs and MAC addresses are typically 48 bits wide. For example, if the BSS color is 6 bits wide, and the BSS color extension is between 4 and 10 bits wide, the combined number of bits is between 10 and 16 bits. When the combined number of bits is a total of 10 bits, the number of unique combinations of values is 1024, and when the combined number of bits is a total of 16 bits, the number of unique combinations of values is 65,536. In some implementations, an AP of a BSS may randomly assign the values for the BSS color and the BSS color extension. When the combined number of bits is between 10 and 16 bits (or higher), the AP has a high probability of selecting a unique combination of values, even when randomly generated. In some implementations, each of the APs of the BSSs in an OBSS setting may share the BSS color and BSS color extension values to ensure unique values are selected for each BSS. In some implementations, the combined or concatenated bits may be selected based on a subset of the bits of the BSSID of the BSS. Additional techniques may be implemented for selecting the values of the combined or concatenated bits. In some implementations, the first WLAN device 110 may select the values of the BSS color and the BSS color extension for a BSS using one of the techniques described here. In some implementations, the first WLAN device 110 may provide the BSS color and BSS color extension to the second WLAN device 120 when associating and establishing a communication link with the second WLAN device 120. For example, the first WLAN device may provide the BSS color and the BSS color extension in a management packet provided to the second WLAN device 120. The second WLAN device 120 may store the BSS color and BSS color extension, and associate the BSS color and BSS color extension with the corresponding BSSID of the BSS. Thus, when the second WLAN device 120 receives a HARQ transmission (such as the first HARQ packet 116), the PHY layer of the second WLAN device 120 may extract the BSS color and BSS color extension from the HARQ transmission. The PHY layer may then determine whether the received BSS color and the BSS color extension are indicative of the BSSID of the BSS by comparing the received values with the values of the stored BSS color and BSS color extension.

In some implementations, after receiving the first HARQ packet 116 and identifying the BSSID of the BSS based on the BSS color and the BSS color extension, the second WLAN device may use the STA ID in the PHY header to determine whether the second WLAN device 120 is the intended recipient within the BSS of the first HARQ packet 116. As described in this disclosure, once the BSSID of the BSS is derived based on the BSS color and the BSS color extension, a 12-bit STA ID is typically sufficient to identity the intended recipient in the BSS.

Figure 3:
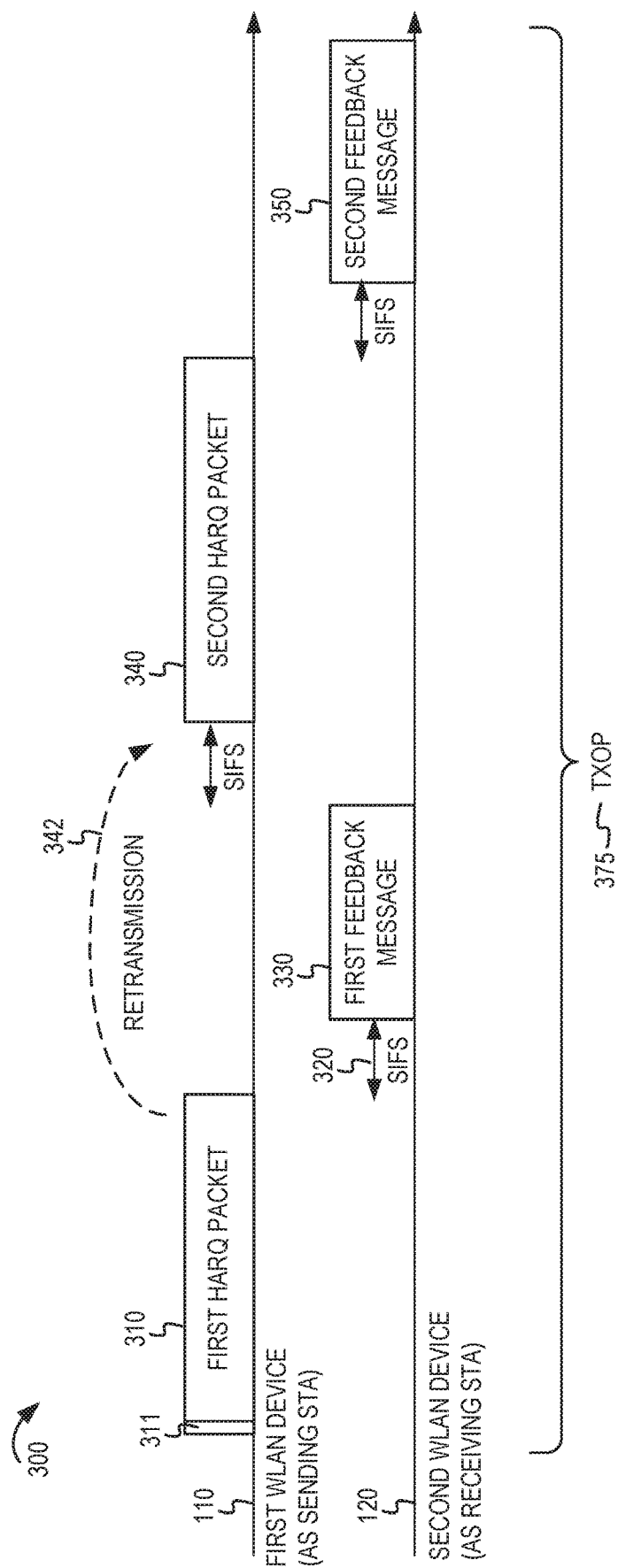
FIG. 3 depicts an example HARQ transmission having multiple HARQ packets according to a HARQ protocol.

FIG. 3 depicts an example HARQ transmission having multiple HARQ packets according to a HARQ protocol. The HARQ transmission also may be referred to as a HARQ process. A HARQ process 300 may begin with a first HARQ packet 310 from the first WLAN device 110 to the second WLAN device 120. The first HARQ packet 310 may be the initial PPDU or packet in the HARQ exchange for a particular TXOP 375. The first HARQ packet 310 may include initial transmissions of a first set of FEC codewords. The first HARQ packet 310 may include a HARQ indicator (such as a bit, field, or sub-field in a PHY header 311) to indicate that the transmission is a HARQ transmission. For example, a bit in the PHY header 311 may be set to 1 if the first HARQ packet 310 is a HARQ transmission, or the bit may be set to 0 if the first HARQ packet 310 is a non-HARQ transmission. As described in this disclosure, the PHY header 311 also may include a STA ID, a BSS color, and a BSS color extension. In some implementations, the combination of the BSS color and the BSS color extension may indicate the BSSID of the BSS associated with the first WLAN device 110 and the second WLAN device 120.

In response to receiving the first HARQ packet 310, the second WLAN device 120 may process the PHY header 311 to determine whether the first HARQ packet 310 is intended for the second WLAN device 120. For example, the second WLAN device 120 may combine the BSS color and the BSS color extension, and may determine a BSSID that is associated with the combination. The second WLAN device 120 may compare the determined BSSID with the BSSID of the BSS associated with the second WLAN device 120. If the BSSIDs match, then the second WLAN device 120 may determine the first HARQ packet 310 is intended for one of the devices in the BSS. The second WLAN device 120 may then determine whether the STA ID included in the first HARQ packet 310 indicates that the second WLAN device 120 is the intended recipient. For example, the STA ID may indicate the address of the second WLAN device 120 (such as the RA or MAC address), or may be used to derive the address of the second WLAN device 120. After determining the second WLAN device 120 is the intended recipient, the second WLAN device 120 may further process the first HARQ packet 310, and send the first feedback message 330 to the first WLAN device 110.

In some implementations, the first feedback message 330 may be a HARQ acknowledgement (H-ACK) message. The first feedback message 330 may begin after a short interframe space (SIFS) 320, which represents a determinable time period to maintain synchronization in the WLAN. The first feedback message 330 may include an indicator (such as a bit, field, or sub-field in the PHY header) to indicate whether the first feedback message 330 is an H-ACK message or a non-HARQ ACK message. In some implementations, when the first feedback message 330 is an H-ACK message, the first feedback message 330 may indicate the FEC codewords of the first HARQ packet 310 that had a decoding failure. When the first feedback message 330 is a non-HARQ ACK message, the first feedback message 330 may indicate that most or all of the codewords failed, and to retransmit the complete packet in accordance with a traditional, non-HARQ retransmission process (such as the ARQ retransmission process).

In response to determining the first feedback message 330 is an H-ACK message, the first WLAN device 110 may send the second HARQ packet 340 to the second WLAN device 120 (such as after a SIFS period). The second HARQ packet 340 may represent a retransmission 342 of a least a portion of the first HARQ packet 310 or information (such as codewords) that will be used to try to decode and recover the portions of the first HARQ packet 310 that failed. For example, the second HARQ packet 340 may include retransmissions regarding the FEC codewords that were indicated in the first feedback message 330 as having a decoding failure.

Following the second HARQ packet 340, the second WLAN device 120 may send a second feedback message 350 (such as after a SIFS period). In some implementations, the second feedback message 350 may be an ACK message acknowledging when the second WLAN device 120 has successfully recovered the MPDUs for the HARQ transmission (from multiple HARQ packets) and indicating the completion of the HARQ process 300 for the TXOP 375.

Figure 4:
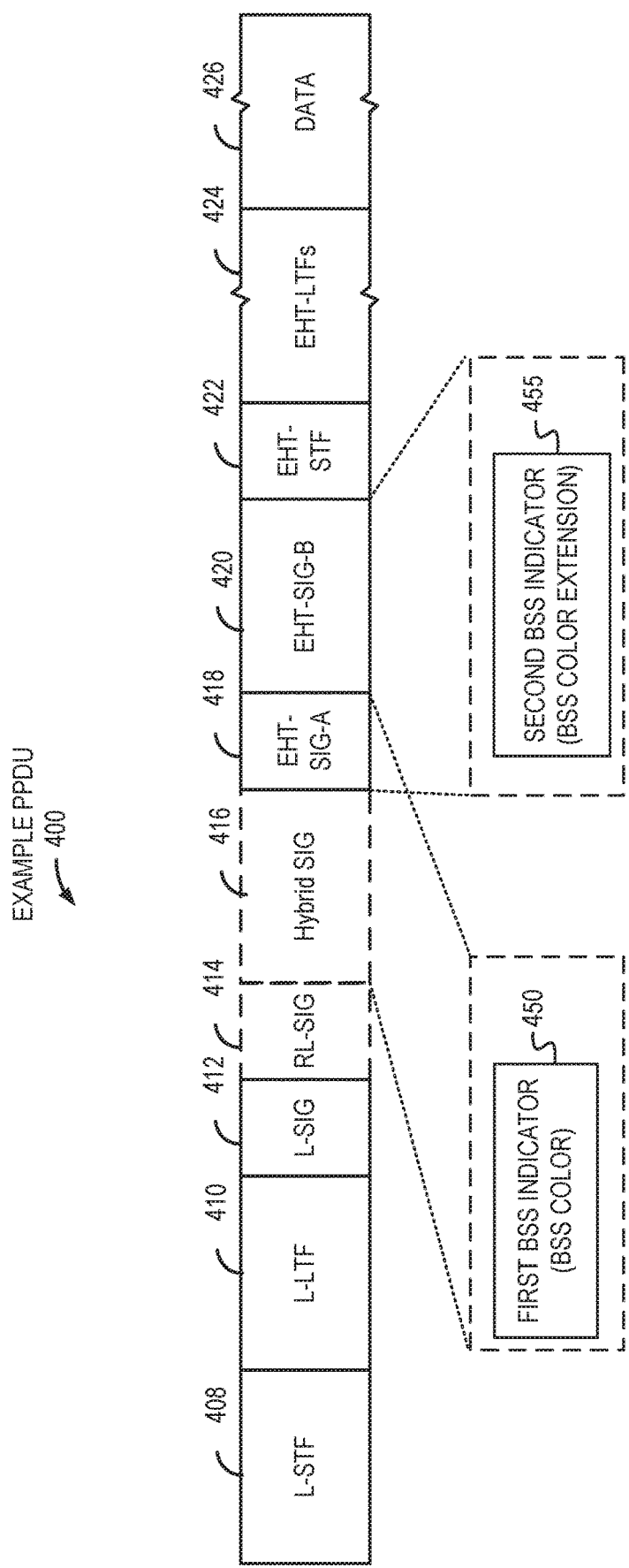
FIG. 4 depicts an example physical convergence layer (PHY) protocol data unit (PPDU) format for HARQ transmissions.

FIG. 4 depicts an example PPDU format for HARQ transmissions. The example PPDU 400 shown in FIG. 4 may be used for HARQ transmissions between the WLAN device 110 and the second WLAN device 120. In some implementations, the PPDU 400 may be formatted as an Extreme High Throughput (EHT) PPDU in accordance with the IEEE 802.11be amendment to the IEEE 802.11 wireless communication protocol standard. In some implementations, the PPDU 400 may include a legacy short training field (L-STF) 408, a legacy long training field (L-LTF) 410, a legacy signal (L-SIG) field 412, a repeated legacy signal (RL-SIG) field 414, a Hybrid SIG field 416, an EHT-SIG-A field 418, an EHT-SIG-B field 420, an EHT-STF 422, an EHT-LTF 424, and a DATA field 426. Although the EHT-SIG-A and EHT-SIG-B fields are represented as EHT-related fields, the EHT-SIG-A and EHT-SIG-B fields may be structured as, and carry version-dependent information for, other wireless communication protocol versions beyond EHT.

The L-STF 408 generally enables a receiving STA to perform automatic gain control (AGC) and coarse timing and frequency estimation. The L-LTF 410 generally enables a receiving STA to perform fine timing and frequency estimation and also to perform an initial estimate of the wireless channel. The L-SIG 412 generally enables a receiving STA to determine a duration of the PPDU 400 and to use the determined duration to avoid transmitting on top of the PPDU 400. The RL-SIG field 414 may be used for packet classification and may indicate the PPDU 400 is backward compatible with High Efficiency (HE) protocols in accordance with the IEEE 802.11ax amendment to the IEEE 802.11 wireless communication protocol standard. In some implementations, the RL-SIG field 414 may be an optional field in EHT- or later version-compliant PPDUs. In some implementations, when the PPDU 400 is an EHT- or later version-compliant PPDU, the PPDU 400 may include an additional short training field, referred to as the EHT-STF 422, and an additional long training field, referred to as the EHT-LTF 424.

The Hybrid SIG field 416, the EHT-SIG-A field 418, and the EHT-SIG-B field 420 are signaling fields that may indicate to EHT- or later version-compliant WLAN devices that the PPDU 400 conforms with IEEE 802.11be protocols. In some implementations, the PPDU 400 may include the EHT-SIG-A field 418 and the EHT-SIG-B field 420, and the Hybrid SIG field 416 may be an optional field. In some implementations, the Hybrid SIG field 416 may be used by a receiving WLAN device to interpret bits in one or more of the EHT-SIG-A field 418, the EHT-SIG-B field 420 or the DATA field 426. In some implementations, the Hybrid SIG field 416 may include an indication (such as a reserved bit) that indicates whether the PPDU 400 is, for example, compliant with IEEE 802.11be or a later version of the IEEE 802.11 family of wireless communication protocol standards. In some implementations, the Hybrid SIG field 1016 may include an indication (such as at least one bit in a version subfield) indicating the particular wireless communication protocol version to which the PPDU 400 conforms.

In some implementations, the EHT-SIG-A field 418 may be used by an AP (such as the AP 102) to identify and inform multiple STAs (such as the STAs 104) that the AP has scheduled UL or DL resources. The EHT-SIG-A field 418 may be decoded by each compatible STA served by the AP. In some implementations, the EHT-SIG-A field 418 may include information usable by the compatible STAs to decode the EHT-SIG-B field 420. The EHT-SIG-A field 418 may be used by a receiving WLAN device to interpret bits in the EHT-SIG-B field 420 or the DATA field 426. For example, the EHT-SIG-A field 418 may indicate the location and length of the EHT-SIG-B field 420 in the various component channels, available channel bandwidths, and modulation and coding schemes (MCSs), among other possibilities. The EHT-SIG-A field 418 may further include a cyclic redundancy check (CRC) (for example, four bits) and a tail (for example, 6 bits) that may be used for binary convolutional code (BCC). The EHT-SIG-B field 420 may carry STA-specific scheduling information such as, for example, per-user MCS values and per-user resource unit (RU) allocation information, and may generally be used by a receiving WLAN device to interpret bits in the DATA field 422.

As described in this disclosure, a PHY header of a HARQ PPDU, such as the PPDU 400, may include a first BSS indicator and a second BSS indicator that may be used for identifying the BSS and receiving STA. As shown in FIG. 4, in some implementations, the Hybrid SIG field 416 or the EHT-SIG-A field 418 may include the first BSS indicator 450, which may be a BSS color. Also, the EHT-SIG-A field 418 or the EHT-SIG-B field 420 may include the second BSS indicator 455, which may be a BSS color extension. In some implementations, the first BSS indicator 450 and the second BSS indicator 455 may be included in a single field of the PPDU 400, such as one of the Hybrid SIG field 416, the EHT-SIG-A field 418, or the EHT-SIG-B field 420. In some implementations, the first BSS indicator 450 and the second BSS indicator 455 may be included in other fields of the PPDU 400. For example, the Hybrid SIG field 416 may include the second BSS indicator 450, and the EHT-SIG-B field 420 may include the first BSS indicator 455. As described herein, the Hybrid SIG field 416 may be an optional field. When the PPDU 400 includes the Hybrid SIG field 416, WLAN devices that implement the IEEE 802.11ax protocols may decode the Hybrid SIG field 416 as a high efficiency (HE) SIG A field in order to detect and decode the BSS color, and achieve coexistence when the WLAN includes both IEEE 802.11ax WLAN devices and IEEE 802.11be WLAN devices.

Figure 5:
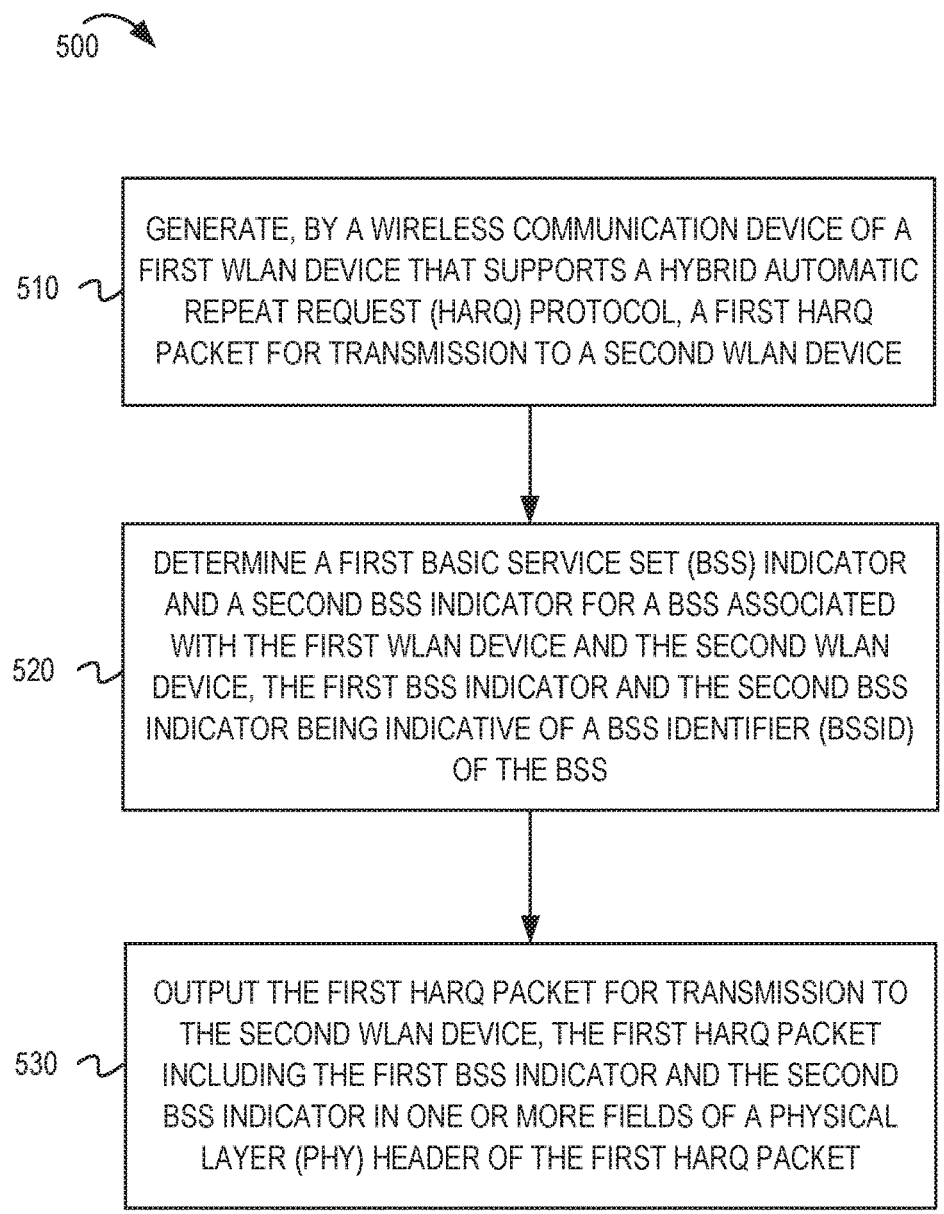
FIG. 5 depicts a flowchart with example operations performed by a wireless communication device of a sending station (STA) for implementing a HARQ process with basic service set (BSS) and station identification.

FIG. 5 depicts a flowchart 500 with example operations performed by a wireless communication device of a sending STA for implementing a HARQ process with BSS and station identification. A first WLAN device may be the sending STA and a second WLAN device may be the receiving STA.

At block 510, the wireless communication device of the first WLAN device that supports a HARQ protocol may generate a first HARQ packet for transmission to the second WLAN device.

At block 520, the wireless communication device of the first WLAN device may determine a first BSS indicator and a second BSS indicator for a BSS associated with the first WLAN device and the second WLAN device. The first BSS indicator and the second BSS indicator may be indicative of a BSSID of the BSS. In some implementations, a combination or a concatenation of the first BSS indicator and the second BSS indicator may be indicative of the BSSID of the BSS. In some implementations, the first BSS indicator is a BSS color and the second BSS indicator is a BSS color extension.

At block 530, the wireless communication device of the first WLAN device may output the first HARQ packet for transmission to the second WLAN device. The first HARQ packet may include the first BSS indicator and the second BSS indicator in one or more fields of a PHY header of the first HARQ packet.

Figure 6:
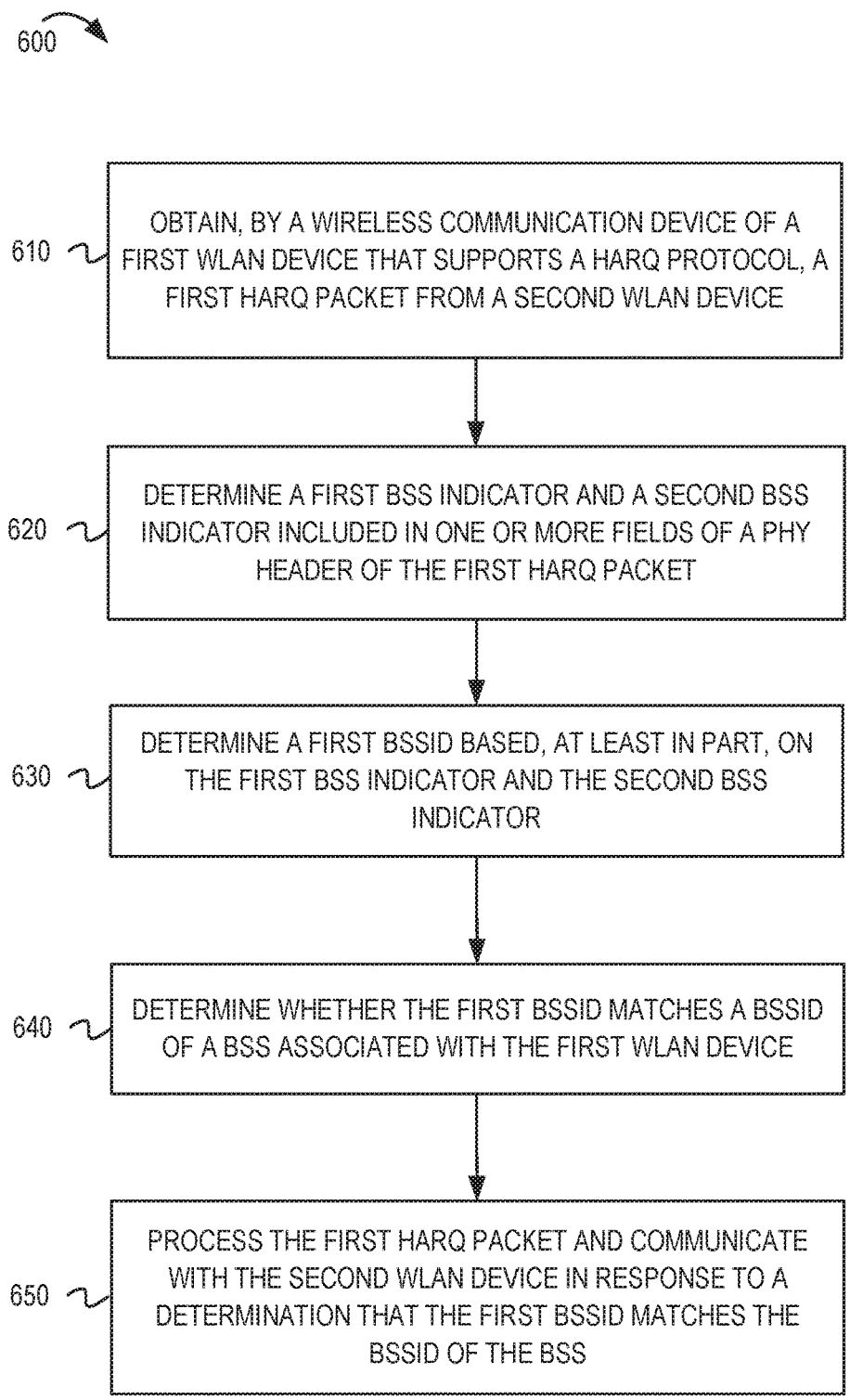
FIG. 6 depicts a flowchart with example operations performed by a wireless communication device of a receiving STA for implementing a HARQ process with BSS and station identification.

FIG. 6 depicts a flowchart 600 with example operations performed by a wireless communication device of a receiving STA for implementing a HARQ process with BSS and station identification. A first WLAN device may be the receiving STA and a second WLAN device may be the sending STA.

At block 610, the wireless communication device of the first WLAN device that supports the HARQ protocol may obtain a first HARQ packet from a second WLAN device.

At block 620, the wireless communication device of the first WLAN device may determine a first BSS indicator and a second BSS indicator included in one or more fields of a PHY header of the first HARQ packet.

At block 630, the wireless communication device of the first WLAN device may determine a first BSSID based, at least in part, on the first BSS indicator and the second BSS indicator. In some implementations, a combination or a concatenation of the first BSS indicator and the second BSS indicator may be indicative of the BSSID of the BSS. In some implementations, the first BSS indicator is a BSS color and the second BSS indicator is a BSS color extension.

At block 640, the wireless communication device of the first WLAN device may determine whether the first BSSID matches a BSSID of a BSS associated with the first WLAN device.

At block 650, the wireless communication device of the first WLAN device may process the first HARQ packet and communicate with the second WLAN device in response to determining the first BSSID matches the BSSID of the BSS associated with the first WLAN device. The first HARQ packet may be discarded in response to determining the first BSSID does not match the BSSID of the BSS.

In some implementations, instead of adding additional bits to the PHY header (such as the BSS color extension) to help identify the BSS and the receiving WLAN device, the first WLAN device may schedule a non-HARQ transmission that includes the BSSID of the BSS prior to the sequence of HARQ transmissions.

Figure 7:
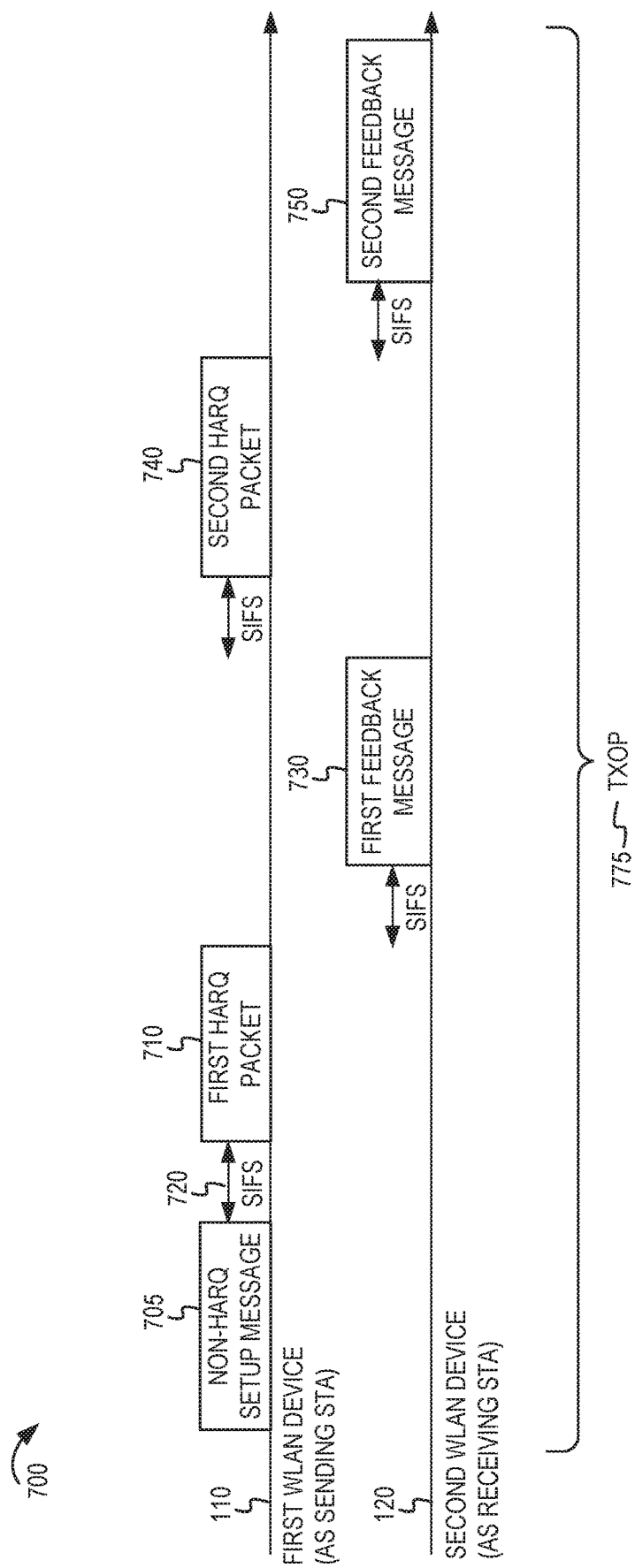
FIG. 7 depicts an example HARQ transmission having a non-HARQ transmission followed by multiple HARQ packets according to a HARQ protocol.

FIG. 7 depicts an example HARQ transmission having a non-HARQ transmission followed by multiple HARQ packets according to a HARQ protocol. The HARQ transmission also may be referred to as a HARQ process. A HARQ process 700 may begin with the first WLAN device 110 transmitting a non-HARQ setup message 705 to the second WLAN device 120 prior to transmitting a first HARQ packet 710. The non-HARQ setup message 705 (which also may be referred to as a non-HARQ scheduling message) may indicate to the second WLAN device 120 that the first WLAN device 110 will transmit a sequence of HARQ packets to the second WLAN device 120 following the non-HARQ setup message 705. For example, the non-HARQ setup message 705 may include a HARQ setup indicator (such as a bit, field, or sub-field in a PHY header or a MAC header) to indicate that the message is a non-HARQ setup message 705. The non-HARQ setup message 705 also may include BSS information in the MAC header, such as the BSSID of the BSS associated with the first WLAN device 110 and the RA of the intended recipient. In some implementations, the non-HARQ setup message 705 may be a request to send (RTS) message or a similar type of message. When the first WLAN device 110 transmits an RTS message to the second WLAN device 120, the first WLAN device 110 may wait to transmit the sequence of HARQ packets until after receipt of a clear to send (CTS) message or a similar type of message from the second WLAN device 120.

The second WLAN device 120 may receive the non-HARQ transmission. The second WLAN device 120 may determine that the received transmission is a non-HARQ setup message (such as the non-HARQ setup message 705) based on the HARQ setup indicator, and thus determine that the first WLAN device 110 will transmit a sequence of HARQ packets following the HARQ setup message 705. The second WLAN device 120 also may determine the BSSID included in the non-HARQ setup message 705, and determine whether the BSSID included in the non-HARQ setup message 705 matches the BSSID of the BSS associated with the second WLAN device 120. The second WLAN device 120 also may determine whether the RA (which also may be included in the MAC header of the non-HARQ setup message 705) matches the address of the second WLAN device 120. If the BSSIDs and the addresses match, then this may serve as confirmation that the second WLAN device 120 is the intended receiver of the sequence of HARQ transmissions that will follow the non-HARQ setup message 705. Thus, even if the MAC headers of the first HARQ packet 710 are corrupted or not successfully decoded, the second WLAN device 120 may know in advance that the first HARQ packet 710 is intended for the second WLAN device 120 and the second WLAN device 120 should process and decode the first HARQ packet 710. In some implementations, when the second WLAN device 120 receives an RTS message (as the non-HARQ setup message 705) from the first WLAN device 110, the second WLAN device 120 may transmit a CTS message (not shown) to the first WLAN device 110 after confirming the second WLAN device 120 is the intended receiver of the RTS message. In some implementations, the second WLAN device 120 may transmit the CTS message to the first WLAN device 110 during a SIFS period 720.

In some implementations, after transmitting the non-HARQ setup message 705, the first WLAN device 110 may transmit the first HARQ packet 710 to the second WLAN device 120 after the SIFS period 720, which represents a determinable time period to maintain synchronization in the WLAN. The first WLAN device 110 should retain the channel and transmission opportunity as long as the first HARQ packet 710 is transmitted within a relatively short period of time (such as the SIFS period 720) after the non-HARQ setup message 705. In some implementations, when the first WLAN device 110 transmits an RTS message to the second WLAN device 120, the first WLAN device 110 may transmit the first HARQ packet 710 after receipt of a CTS message from the second WLAN device 120. The second WLAN device 120 may begin processing the first HARQ packet 710 because the second WLAN device 120 knows in advance that the first WLAN device 110 had scheduled the HARQ transmissions intended for the second WLAN device 120 based on the non-HARQ setup message 705. In some implementations, in addition to knowing in advance that the first WLAN device 110 has scheduled of the HARQ transmissions, the second WLAN device 120 may process the BSS color and the STA ID in the PHY header of the first HARQ packet 710 to further confirm the second WLAN device 120 is the intended recipient.

Similar to the first HARQ packet 310 of FIG. 3, the first HARQ packet 710 of FIG. 7 may include initial transmissions of a first set of FEC codewords. In some implementations, the first HARQ packet 710 also may include a HARQ indicator (such as a bit, field, or sub-field in a PHY header) to indicate that the transmission is a HARQ transmission. For example, a bit in the PHY header may be set to 1 if the first HARQ packet 710 is a HARQ transmission, or the bit may be set to 0 if the first HARQ packet 710 is a non-HARQ transmission.

After processing and decoding the first HARQ packet 710, the second WLAN device 120 may send the first feedback message 730 to the first WLAN device 110. The first feedback message 730 may be a HARQ Acknowledgement (H-ACK) message. The first feedback message 730 may be transmitted by the second WLAN device 120 after a SIFS period. In some implementations, the first feedback message 730 may include an indicator (such as a bit, field, or sub-field in the PHY header) to indicate whether the first feedback message 730 is an H-ACK message or a non-HARQ ACK message. In some implementations, when the first feedback message 730 is an H-ACK message, the first feedback message 730 may indicate the FEC codewords that had a decoding failure. When the first feedback message 730 is a non-HARQ ACK message, the first feedback message 730 may indicate that most or all of the codewords failed, and to retransmit the complete packet in accordance with a traditional, non-HARQ retransmission process (such as the ARQ retransmission process).

In response to determining the first feedback message 730 is an H-ACK message, the first WLAN device 110 may send the second HARQ packet 740 to the second WLAN device 120 (such as after a SIFS period). The second HARQ packet 740 may represent a retransmission of a least a portion of the first HARQ packet 710 or information (such as codewords)

that will be used to try to decode and recover the portions of the first HARQ packet 710 that failed. For example, the second HARQ packet 740 may include retransmissions regarding the FEC codewords that were indicated in the first feedback message 730 as having a decoding failure.

Following the second HARQ packet 740, the second WLAN device 120 may send a second feedback message 750 (such as after a SIFS period). In some implementations, the second feedback message 750 may be an ACK message acknowledging when the second WLAN device 120 has successfully recovered the MPDUs for the HARQ transmission (from multiple HARQ packets) and indicating the completion of the HARQ process 700 for a TXOP 775.

Figure 8:
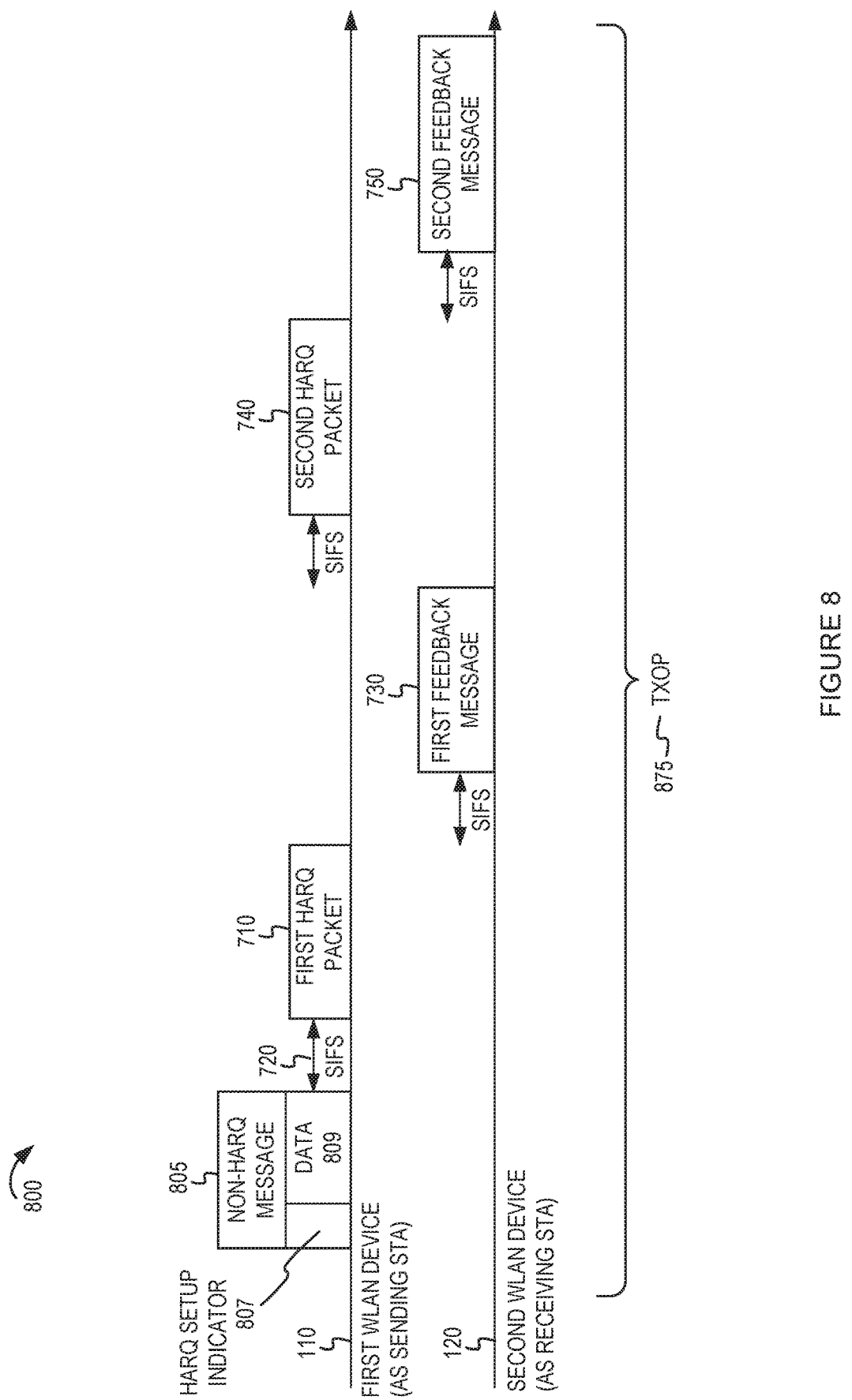
FIG. 8 depicts an example non-HARQ and HARQ transmission sequence having a non-HARQ message followed by multiple HARQ packets according to a HARQ protocol.

FIG. 8 depicts an example non-HARQ and HARQ transmission sequence having a non-HARQ message followed by multiple HARQ packets according to a HARQ protocol. A transmission sequence 800 may begin with a non-HARQ message 805 that includes a HARQ setup indicator 807 and data 809. The non-HARQ message 805 may have a single user (SU) PPDU format or a multi-user (MU) PPDU format. For example, when the non-HARQ message 805 has an SU PPDU format, the non-HARQ message 805 may include the HARQ setup indicator 807 and the data 809, both of which are intended for the second WLAN device 120. When the non-HARQ message 805 has a MU PPDU format, the non-HARQ message 805 may include both the HARQ setup indicator 807 that is intended for the second WLAN device 120 and the data 809 that is intended for the second WLAN device 120 or for a different WLAN device. The first WLAN device 110 may transmit the non-HARQ message 805 to the second WLAN device 120 prior to transmitting the first HARQ packet 710. The non-HARQ message 805 may include the HARQ setup indicator 807 (which also may be referred to as a HARQ scheduling indicator) to indicate to the second WLAN device 120 that the first WLAN device 110 will transmit a sequence of HARQ packets following the non-HARQ message 805. The HARQ setup indicator 807 may be a bit, field, or sub-field in a PHY header or a MAC header, or may be a separate MAC packet (which also may be referred to as a HARQ setup packet), that indicates the first WLAN device 110 will transmit the sequence of HARQ packets after the non-HARQ message 805. The data 809 may be data bits in a payload, or may be a separate data packet, that is intended for the second WLAN device 120 or for a different WLAN device. For example, when the non-HARQ message 805 includes both a HARQ setup packet and a data packet, a first portion of the frequency bandwidth (such as the upper 40 MHz) may be used to transmit the data packet, and a second portion of the frequency bandwidth (such as the lower 40 MHz) may be used to transit the HARQ setup packet (which also may be referred to as the HARQ setup indicator 807). The non-HARQ message 805 also may include MAC information in one or more MAC headers, such as the BSSID of the BSS associated with the first WLAN device 110 and the RA of the intended recipient.

The second WLAN device 120 may receive the non-HARQ transmission and determine that the message is a non-HARQ message (such as the non-HARQ message 805) based on the HARQ setup indicator 807. Based on receipt of the non-HARQ message 805, the second WLAN device 120 also may determine that the first WLAN device 110 will transmit a sequence of HARQ packets following the non-HARQ message 805. The second WLAN device 120 may determine the BSSID included in the non-HARQ message 805, and determine whether the BSSID included in the non-HARQ message 805 matches the BSSID of the BSS associated with the second WLAN device 120. The second WLAN device 120 also may determine whether the RA (which also may be included in a MAC header of the non-HARQ message 805) matches the address of the second WLAN device 120. If the BSSIDs and the addresses match, then this may serve as confirmation that the second WLAN device 120 is the intended receiver of the sequence of HARQ transmissions that will follow the non-HARQ message 805. Thus, even if the MAC headers of the first HARQ packet 710 are corrupted or not successfully decoded, the second WLAN device 120 may know in advance that the first HARQ packet 710 is intended for the second WLAN device 120 and the second WLAN device 120 should process and decode the first HARQ packet 710. In some implementations, the second WLAN device 120 also may determine whether to process the data 809. For example, if the non-HARQ message 805 has an SU PPDU format, the data 809 may be intended for the second WLAN device 120, and thus the second WLAN device 120 may process the data 809. If the non-HARQ message 805 has an MU PPDU format, the data 809 may be intended for a different WLAN device, and thus the second WLAN device 120 may ignore and discard the data 809.

Similar to FIG. 7, the transmission sequence 800 also may include the first HARQ packet 710, the first feedback message 730, the second HARQ packet 740, and the second feedback message 750, each transmitted after a SIFS period within a TXOP 875.

Figure 9:
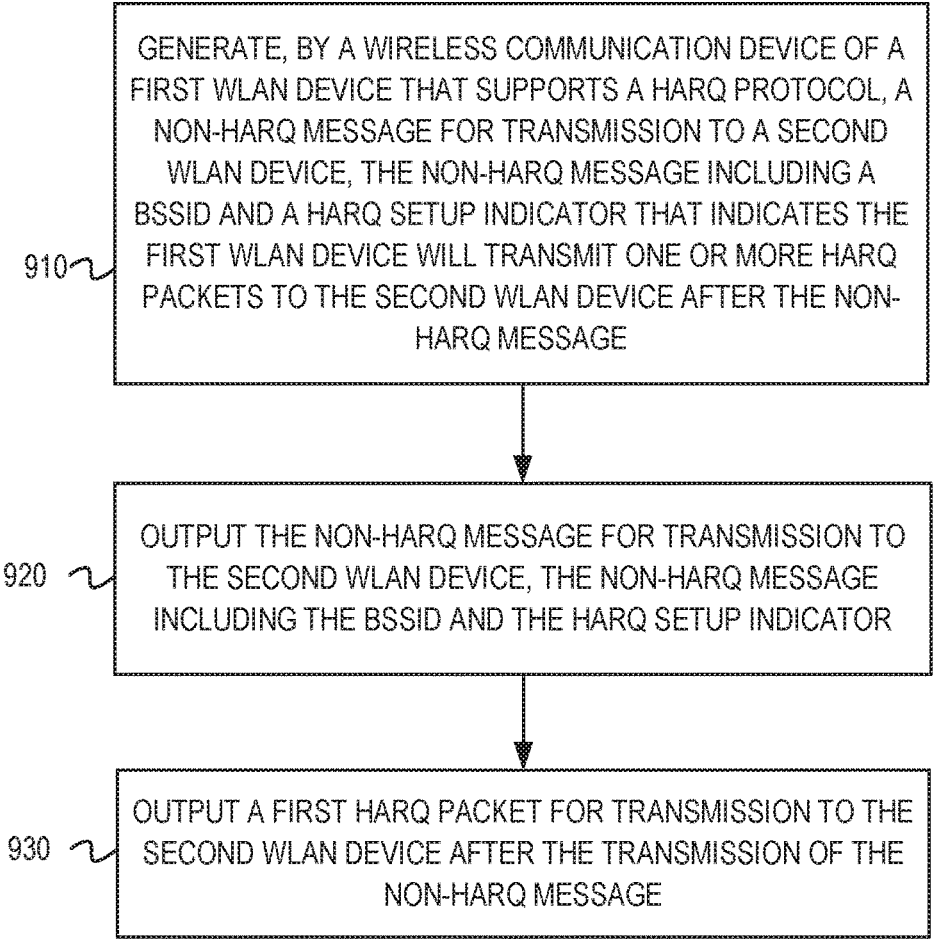
FIG. 9 depicts a flowchart with example operations performed by a wireless communication device of a sending STA for implementing a HARQ process with BSS and station identification.

FIG. 9 depicts a flowchart 900 with example operations performed by a wireless communication device of a sending STA for implementing a HARQ process with BSS and station identification. A first WLAN device may be the sending STA and a second WLAN device may be the receiving STA.

At block 910, the wireless communication device of the first WLAN device that supports a HARQ protocol may generate a non-HARQ message for transmission to the second WLAN device. The non-HARQ message may include a BSSID and a HARQ setup indicator that indicates the first WLAN device will transmit one or more HARQ packets to the second WLAN device after the non-HARQ message.

At block 920, the wireless communication device of the first WLAN device may output the non-HARQ message for transmission to the second WLAN device. The non-HARQ message may include the BSSID and the HARQ setup indicator.

At block 930, the wireless communication device of the first WLAN device may output a first HARQ packet for transmission to the second WLAN device after the transmission of the non-HARQ message.

Figure 10:
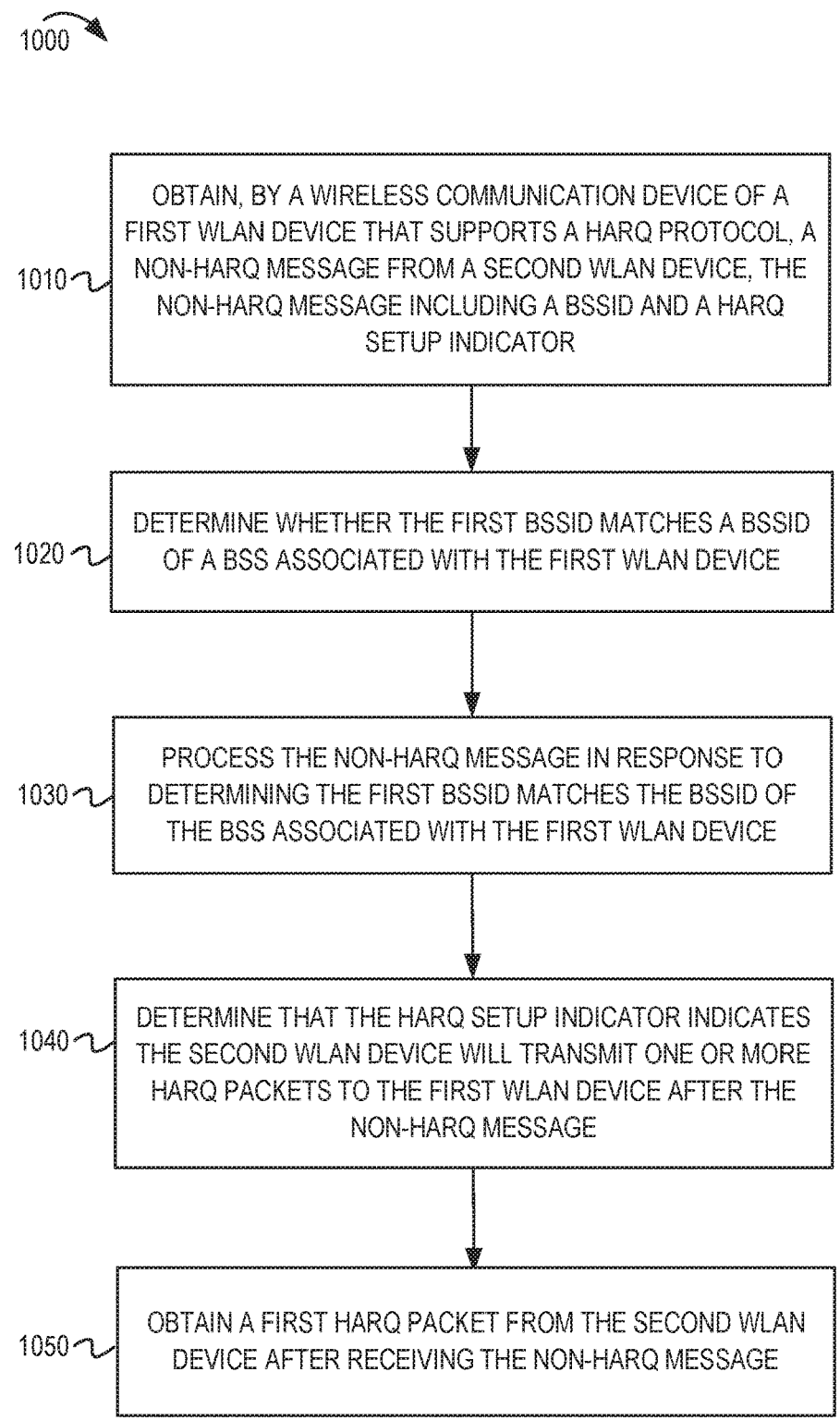
FIG. 10 depicts a flowchart with example operations performed by a wireless communication device of a receiving STA for implementing a HARQ process with BSS and station identification.

FIG. 10 depicts a flowchart 1000 with example operations performed by a wireless communication device of a receiving STA for implementing a HARQ process with BSS and station identification. A first WLAN device may be the receiving STA and a second WLAN device may be the sending STA.

At block 1010, the wireless communication device of the first WLAN device that supports the HARQ protocol may obtain a non-HARQ message from a second WLAN device. The non-HARQ message may include a first BSSID and a HARQ setup indicator.

At block 1020, the wireless communication device of the first WLAN device may determine whether the first BSSID matches a BSSID of a BSS associated with the first WLAN device.

At block 1030, the wireless communication device of the first WLAN device may process the non-HARQ message in response to determining the first BSSID matches the BSSID of the BSS associated with the first WLAN device.

At block 1040, the wireless communication device of the first WLAN device may determine that the HARQ setup indicator indicates the second WLAN device will transmit one or more HARQ packets to the first WLAN device after the non-HARQ message.

At block 1050, the wireless communication device of the first WLAN device may obtain a first HARQ packet from the second WLAN device after receiving the non-HARQ message.

In some implementations, instead of sending a non-HARQ transmission prior to the sequence of HARQ transmissions to help identify the BSS and the receiving WLAN device, the PHY layer of the first WLAN device may attempt to process and decode the MAC headers of the first HARQ packet.

Figure 11:
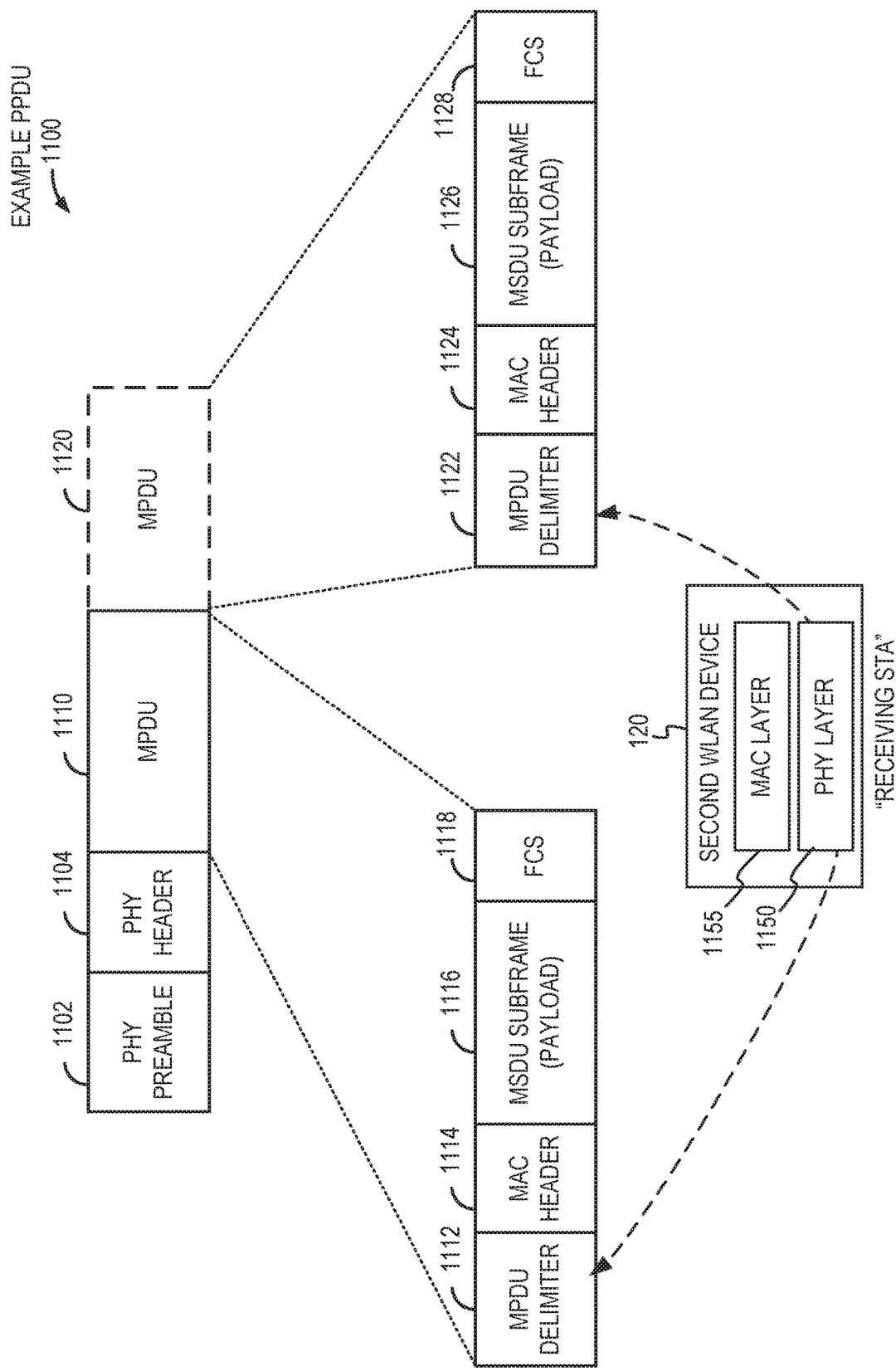
FIG. 11 depicts another example PPDU format for HARQ transmissions.

FIG. 11 depicts another example PPDU format for HARQ transmissions. The example PPDU 1100 shown in FIG. 11 may be used for HARQ transmissions between the WLAN device 110 and the second WLAN device 120. In some implementations, the PPDU 1100 may be formatted as an Extreme High Throughput (EHT) PPDU in accordance with the IEEE 802.11be amendment to the IEEE 802.11 wireless communication protocol standard. In some implementations, the PPDU 1100 may include a PHY preamble 1102, a PHY header, and a single MPDU 1110. In some implementations, the PPDU 1100 may optionally include two or more MPDU, such as the MPDU 1110 and the MPDU 1120. The MPDU 1110 may include an MPDU delimiter 1112, a MAC header 1114, an MSDU subframe (or payload) 1116, and an FCS 1118. The MPDU 1120 may include an MPDU delimiter 1122, a MAC header 1124, an MSDU subframe (or payload) 1126, and an FCS 1128.

In some implementations, the first WLAN device 110 may transmit a first HARQ PPDU to the second WLAN device 120. The first HARQ PPDU may have the format of the example PPDU 1100. In some implementations, instead of waiting for the MAC layer 1155 of the second WLAN device 120 to process the MAC header 1114 of the first HARQ PPDU, the PHY layer 1150 of the second WLAN device 120 may decode the MAC header 1114 and extract the BSSID to determine the BSS and STA information of the intended recipient of the first HARQ PPDU. In some implementations, the PHY layer 1150 of the second WLAN device 120 may search for a starting delimiter (such as the MPDU delimiter 1112) of the MPDU 1110. If the PHY layer 1150 can find the MPDU delimiter 1112, the PHY layer 1150 may attempt to decode the MAC header 1114 in order to extract the BSSID and RA. The PHY layer 1150 also may attempt to validate the FCS 1118. If the MAC header 1114 is decoded and the FCS 1118 is validated, the PHY layer 1150 may determine whether the second WLAN device 120 is the intended receiver of the first HARQ PPDU. For example, the PHY layer 1150 may determine the BSSID from the MAC header 1114, and determine whether the received BSSID matches the BSSID of the BSS associated with the second WLAN device 120. The PHY layer 1150 also may determine whether the received RA matches the address of the second WLAN device 120. If the BSSIDs and addresses match, the PHY layer 1150 may determine that the second WLAN device 120 is the intended receiver of the first HARQ PPDU, and may continue processing the first HARQ PPDU and determine how to respond to the first WLAN device 110 (such as by sending a HARQ feedback message).

In some implementations, if MPDU delimiter 1112 is detected and the MAC header 1114 is decoded, but the FCS 1118 is not validated, the PHY layer 1150 may still use the BSSID and the RA to determine whether the second WLAN device 120 is the intended recipient of the first HARQ PPDU. Even if the FCS 1118 is not validated, if all 48 bits of the BSSID that is included in the MAC header 1114 matches the BSSID of the BSS associated with the second WLAN device 120, then there is a very high likelihood that the second WLAN device 120 is the intended recipient because it is statistically difficult to match 48 bits. In some implementations, after determining the BSSIDs match, the PHY layer 1150 also may use the STA ID in the PHY header 1104 to further confirm the second WLAN device 120 is the intended recipient.

In some implementations, even if the MPDU delimiter 1112 (the first delimiter) or the MAC header 1114 (the first MAC header) is not detectable or is corrupted, the PHY layer 1150 may search for and detect a different delimiter and MAC header, such as the MPDU delimiter 1122 and the MAC header 1124. The PHY layer 1150 may be able to detect the MPDU delimiter 1122 and may be able to decode the MAC header 1124 to extract the BSS information and determine whether there is a BSSID match, as described herein. In some implementations, even if the MPDU delimiter 1112 or the MAC header 1114 is not detectable or is corrupted, the PHY layer 1150 may attempt to search for a matching address or other BSS information in the rest of the code words of the PPDU. If a matching address or BSSID is found, then there is a very high likelihood that the second WLAN device 120 is the intended recipient because it is statistically difficult to match 48 bits.

Figure 12:
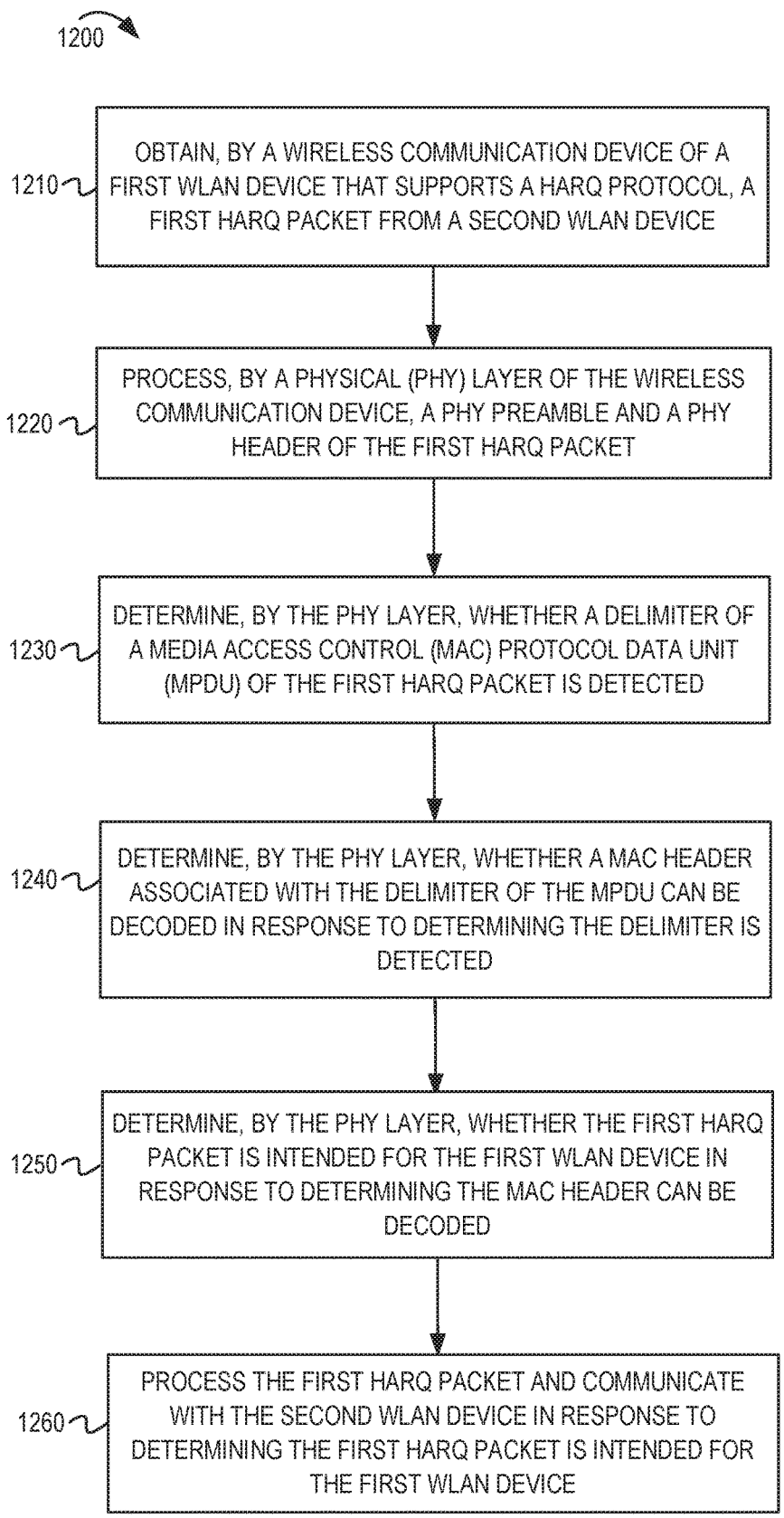
FIG. 12 depicts a flowchart with example operations performed by a wireless communication device of a receiving STA for implementing a HARQ process with BSS and station identification.

FIG. 12 depicts a flowchart 1200 with example operations performed by a wireless communication device of a receiving STA for implementing a HARQ process with BSS and station identification. A first WLAN device may be the receiving STA and a second WLAN device may be the sending STA.

At block 1210, the wireless communication device of the first WLAN device that supports the HARQ protocol may obtain a first HARQ packet from a second WLAN device.

At block 1220, a PHY layer of the wireless communication device of the first WLAN device may process a PHY preamble and a PHY header of the first HARQ packet.

At block 1230, a PHY layer of the wireless communication device of the first WLAN device may determine whether a delimiter of an MPDU of the first HARQ packet is detected.

At block 1240, a PHY layer of the wireless communication device of the first WLAN device may determine whether a MAC header associated with the delimiter of the MPDU can be decoded in response to determining the delimiter is detected.

At block 1250, a PHY layer of the wireless communication device of the first WLAN device may determine whether the first HARQ packet is intended for the first WLAN device in response to determining the MAC header can be decoded.

At block 1260, a PHY layer of the wireless communication device of the first WLAN device may process the first HARQ packet and communicate with the second WLAN device in response to determining the first HARQ packet is intended for the first WLAN device.

Figure 13:
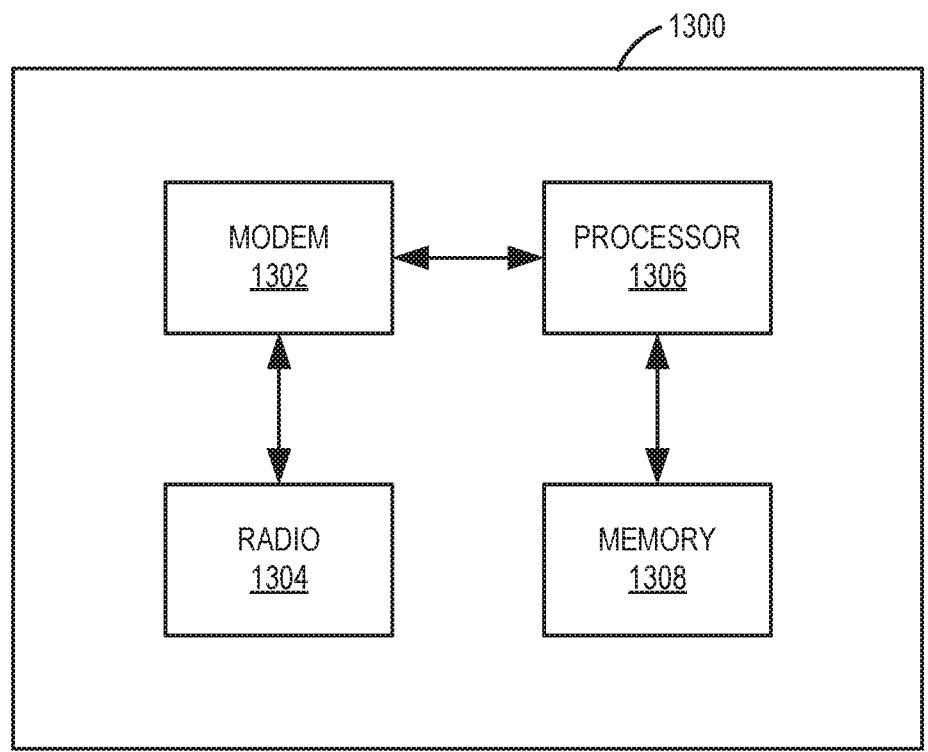
FIG. 13 shows a block diagram of an example wireless communication device.

FIG. 13 shows a block diagram of an example wireless communication device 1300. In some implementations, the wireless communication device 1300 can be an example of a device for use in a STA such as one of the STAs 104 described herein. In some implementations, the wireless communication device 1300 can be an example of a device for use in an AP such as the AP 102 described herein. The wireless communication device 1300 is capable of transmitting (or outputting for transmission) and receiving wireless communications (for example, in the form of wireless packets). For example, the wireless communication device 1300 can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 1300 can be, or can include, a chip, system on chip (SoC), chipset, package or device that includes one or more modems 1302, for example, a Wi-Fi (IEEE 802.11 compliant) modem. In some implementations, the one or more modems 1302 (collectively "the modem 1302") additionally include a WWAN modem (for example, a 3GPP 4G LTE or 5G compliant modem). In some implementations, the wireless communication device 1300 also includes one or more radios 1304 (collectively "the radio 1304"). In some implementations, the wireless communication device 1300 further includes one or more processors, processing blocks or processing elements (collectively "the processor 1306") and one or more memory blocks or elements (collectively "the memory 1308"). In some implementations, the processor 1306 and the memory 1308 may be referred to as the processing system.

The modem 1302 can include an intelligent hardware block or device such as, for example, an application-specific integrated circuit (ASIC) among other possibilities. The modem 1302 is generally configured to implement a PHY layer. For example, the modem 1302 is configured to modulate packets and to output the modulated packets to the radio 1304 for transmission over the wireless medium. The modem 1302 is similarly configured to obtain modulated packets received by the radio 1304 and to demodulate the packets to provide demodulated packets. In addition to a modulator and a demodulator, the modem 1302 may further include digital signal processing (DSP) circuitry, automatic gain control (AGC), a coder, a decoder, a multiplexer and a demultiplexer. For example, while in a transmission mode, data obtained from the processor 1306 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1304. In implementations involving beamforming, the modulated symbols in the respective spatial streams are precoded via a steering matrix prior to their provision to the IFFT block.

While in a reception mode, digital signals received from the radio 1304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 1306) for processing, evaluation or interpretation.

The radio 1304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 1300 can include, or be coupled with, multiple transmit antennas (each with a corresponding transmit chain) and multiple receive antennas (each with a corresponding receive chain). The symbols output from the modem 1302 are provided to the radio 1304, which then transmits the symbols via the coupled antennas. Similarly, symbols received via the antennas are obtained by the radio 1304, which then provides the symbols to the modem 1302. In some implementations, the radio 1304 and the one or more antennas may form one or more network interfaces (which also may be referred to as "interfaces").

The processor 1306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1306 processes information received through the radio 1304 and the modem 1302, and processes information to be output through the modem 1302 and the radio 1304 for transmission through the wireless medium. For example, the processor 1306 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1306 may generally control the modem 1302 to cause the modem to perform various operations described above.

The memory 1308 can include tangible storage media such as random-access memory (RAM) or read-only memory (ROM), or combinations thereof. The memory 1308 also can store non-transitory processor- or computer-executable software (SW) code containing instructions that, when executed by the processor 1306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the wireless communication device 1300 may include a HARQ protocol unit (not shown). The HARQ protocol unit may be similar to the HARQ protocol unit 112 or the HARQ protocol unit 122 described with reference to FIG. 2 and may implement any of the HARQ techniques described herein. In some implementations, the HARQ protocol unit may be implemented by the processor 1306 and the memory 1308 (which may be referred to as the processing system). The memory 1308 can include computer instructions executable by the processor 1306 to implement the functionality of the HARQ protocol unit. Any of these functionalities may be partially (or entirely) implemented in hardware or on the processor 1306.

In some implementations, the wireless communication device 1300 may include a HARQ transmission unit (not shown), a HARQ reception unit (not shown), a HARQ feedback unit (not shown), or any combination thereof, similar to the HARQ transmission unit 114, the HARQ reception unit 123, and the HARQ feedback unit 124, respectively, as described with reference to FIG. 2. The HARQ transmission unit, the HARQ reception unit, or the HARQ feedback unit may implement any of the HARQ techniques described herein. In some implementations, the HARQ transmission unit, the HARQ reception unit, or the HARQ feedback unit may be implemented by the processor 1306 and the memory 1308 (which may be referred to as the processing system). The memory 1308 can include computer instructions executable by the processor 1306 to implement the functionality of the HARQ transmission unit, the HARQ reception unit, or the HARQ feedback unit. Any of these functionalities may be partially (or entirely) implemented in hardware or on the processor 1306.

Figure 14B:
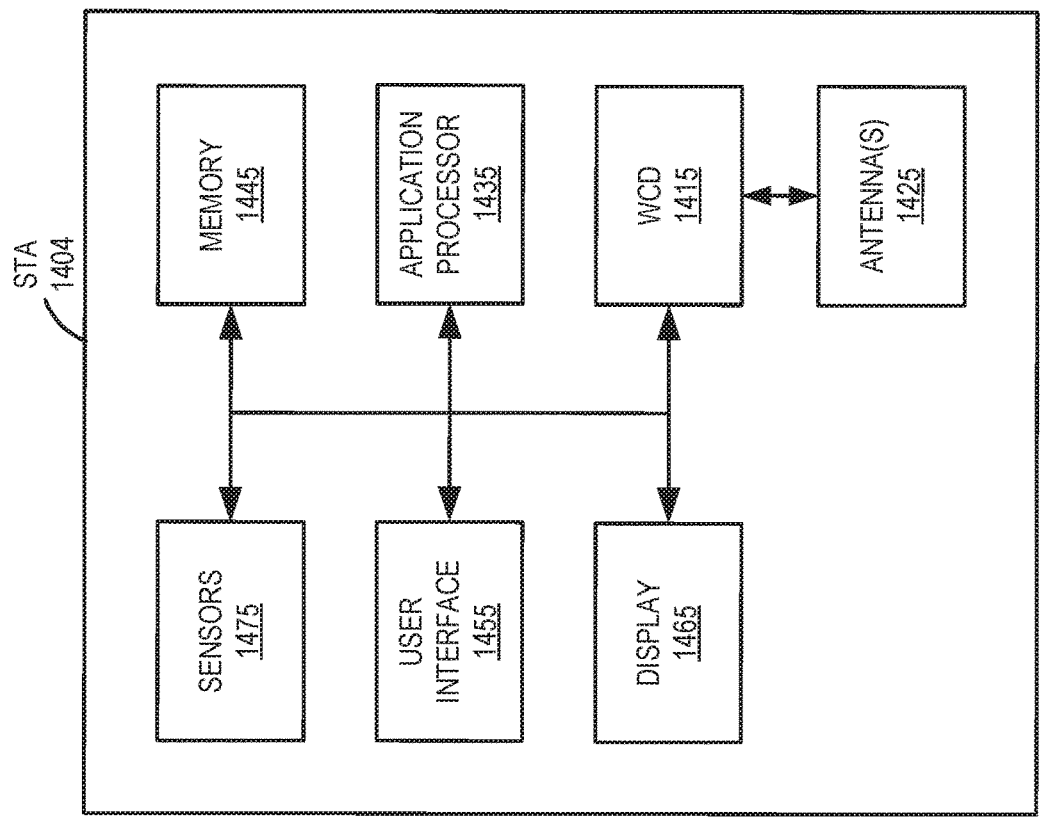
FIG. 14B shows a block diagram of an example STA.
Figure 14A:
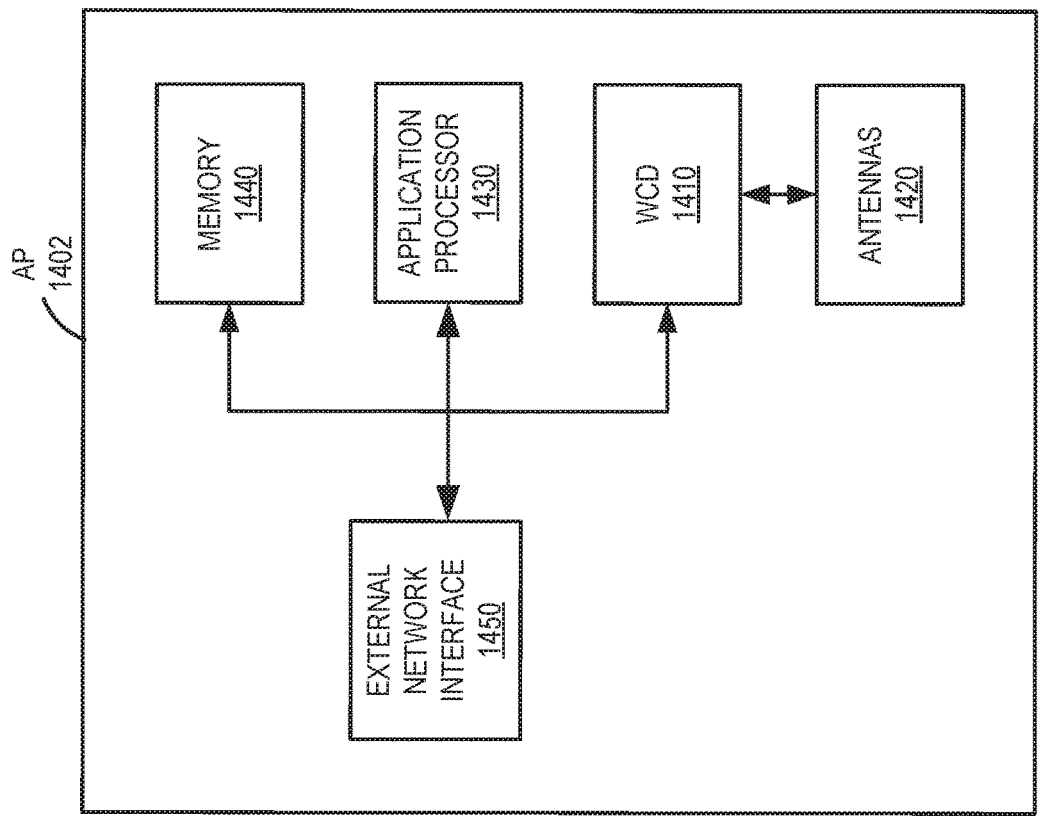
FIG. 14A shows a block diagram of an example AP.

FIG. 14A shows a block diagram of an example AP 1402. For example, the AP 1402 can be an example implementation of the AP 102 described herein. The AP 1402 includes a wireless communication device (WCD) 1410. For example, the wireless communication device 1410 may be an example implementation of the wireless communication device 1300 described with reference to FIG. 13. The AP 1402 also includes multiple antennas 1420 coupled with the wireless communication device 1410 to transmit and receive wireless communications. In some implementations, the AP 1402 additionally includes an application processor 1430 coupled with the wireless communication device 1410, and a memory 1440 coupled with the application processor 1430. The AP 1402 further includes at least one external network interface 1450 that enables the AP 1402 to communicate with a core network or backhaul network to gain access to external networks including the Internet. For example, the external network interface 1450 may include one or both of a wired (for example, Ethernet) network interface and a wireless network interface (such as a WWAN interface). Ones of the aforementioned components can communicate with other ones of the components directly or indirectly, over at least one bus. The AP 1402 further includes a housing that encompasses the wireless communication device 1410, the application processor 1430, the memory 1440, and at least portions of the antennas 1420 and external network interface 1450.

FIG. 14B shows a block diagram of an example STA 1404. For example, the STA 1404 can be an example implementation of the STA 104 described herein. The STA 1404 includes a wireless communication device 1415. For example, the wireless communication device 1415 may be an example implementation of the wireless communication device 1300 described with reference to FIG. 13. The STA 1404 also includes one or more antennas 1425 coupled with the wireless communication device 1415 to transmit and receive wireless communications. The STA 1404 additionally includes an application processor 1435 coupled with the wireless communication device 1415, and a memory 1445 coupled with the application processor 1435. In some implementations, the STA 1404 further includes a user interface (UI) 1455 (such as a touchscreen or keypad) and a display 1465, which may be integrated with the UI 1455 to form a touchscreen display. In some implementations, the STA 1404 may further include one or more sensors 1475 such as, for example, one or more inertial sensors, accelerometers, temperature sensors, pressure sensors, or altitude sensors. Ones of the aforementioned components can communicate with other ones of the components directly or indirectly, over at least one bus. The STA 1404 further includes a housing that encompasses the wireless communication device 1415, the application processor 1435, the memory 1445, and at least portions of the antennas 1425, UI 1455, and display 1465.

Figure 15:
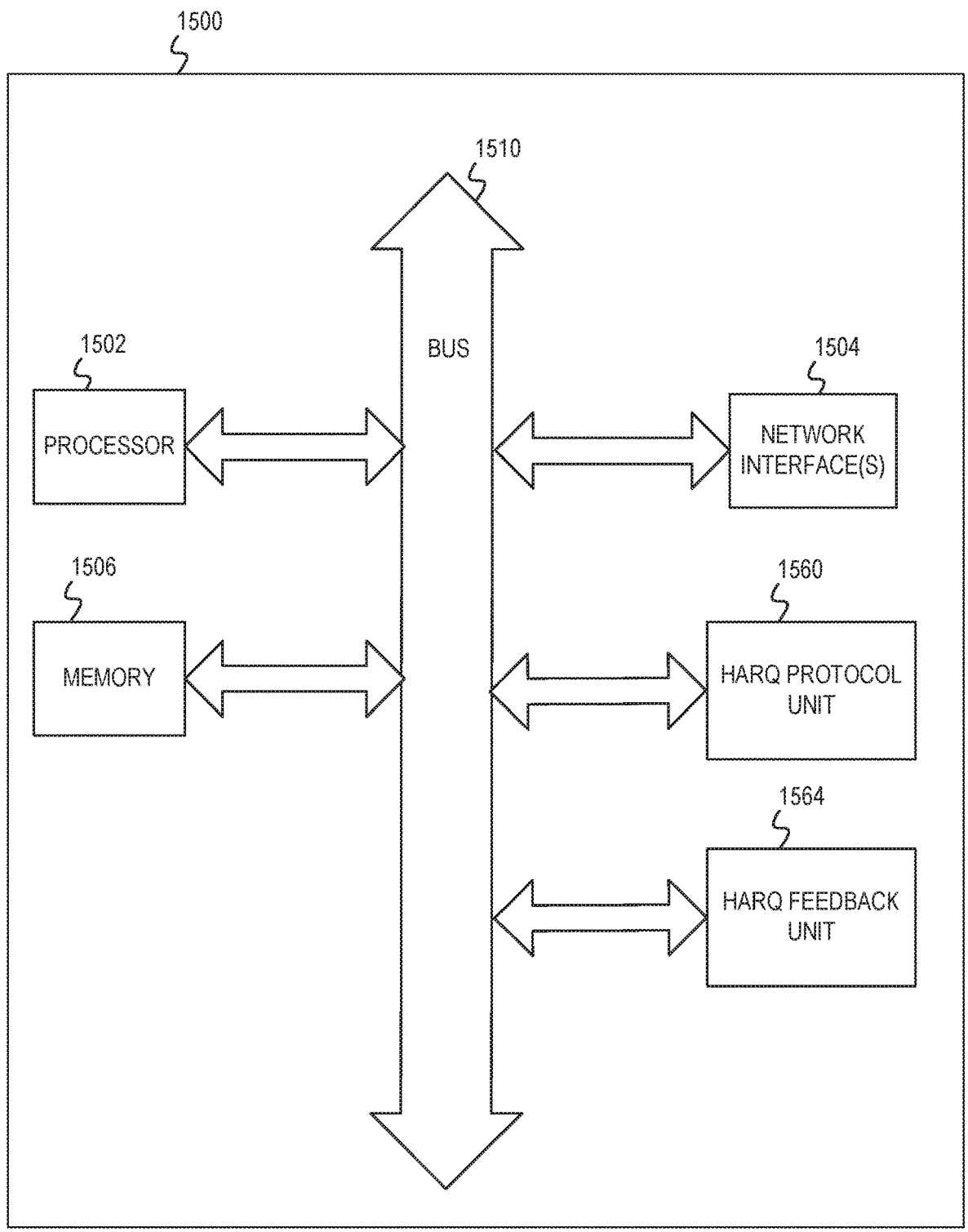
FIG. 15 shows a block diagram of an example electronic device for implementing aspects of this disclosure.

FIG. 15 shows a block diagram of an example electronic device for implementing aspects of this disclosure. In some implementations, the electronic device 1500 may be one of an access point (including any of the APs described herein), a range extender, a station (including any of the STAs described herein) or other electronic systems. The electronic device 1500 can include a processor 1502 (possibly including multiple processors, multiple cores, multiple nodes, or implementing multi-threading, etc.). The electronic device 1500 also can include a memory 1506. The memory 1506 may be system memory or any one or more of the possible realizations of computer-readable media described herein. In some implementations, the processor 1502 and the memory 1506 may be referred to as the processing system. The electronic device 1500 also can include a bus 1510 (such as PCI, ISA, PCI-Express, HyperTransport®, InfiniBand®, NuBus,® AHB, AXI, etc.), and one or more network interfaces 1504 (which may also be referred to as "interfaces") that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1500 may support multiple network interfaces—each of which is configured to couple the electronic device 1500 to a different communication network.

The electronic device 1500 may include a HARQ protocol unit 1560 (which may implement a HARQ protocol as described herein) and a HARQ feedback unit 1564. In some implementations, the HARQ protocol unit 1560 and the HARQ feedback unit 1564 may be distributed within the processor 1502, the memory 1506, and the bus 1510. The HARQ protocol unit 1560 and the HARQ feedback unit 1564 can perform some or all the operations described herein in this disclosure. For example, the HARQ protocol unit 1560 may be similar to the HARQ protocol unit 112 or the HARQ protocol unit 122 as described in FIG. 2. The HARQ feedback unit 1564 may be similar to the HARQ feedback unit 124 described in FIG. 2.

The memory 1506 can include computer instructions executable by the processor 1502 to implement the functionality of the implementations described in FIGS. 1-14. Any of these functionalities may be partially (or entirely) implemented in hardware or on the processor 1502. For example, the functionality may be implemented with an application specific integrated circuit, in logic implemented in the processor 1502, in a co-processor on a peripheral device or card, etc. Further, realizations may include fewer or additional components not illustrated in FIG. 15 (such as video cards, audio cards, additional network interfaces, peripheral devices, etc.). The processor 1502, the memory 1506, and the network interface 1504 are coupled to the bus 1510. Although illustrated as being coupled to the bus 1510, the memory 1506 may be coupled to the processor 1502.

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a wireless communication device of a first wireless local area network (WLAN) device that supports a hybrid automatic repeat request (HARQ) protocol, comprising:
generating a first HARQ packet for transmission to a second WLAN device;
determining a first basic service set (BSS) indicator and a second BSS indicator for a BSS associated with the first WLAN device and the second WLAN device, the first BSS indicator and the second BSS indicator being indicative of a first BSS identifier (BSSID) of the BSS;
outputting the first HARQ packet for transmission to the second WLAN device, the first HARQ packet including the first BSS indicator and the second BSS indicator in one or more fields of a physical layer (PHY) header of the first HARQ packet; and
obtaining a HARQ feedback message from the second WLAN device responsive to the first BSSID indicated by the first BSS indicator and the second BSS indicator matching a second BSSID associated with the second WLAN device.

2. The method of claim 1, wherein a combination of the first BSS indicator and the second BSS indicator is indicative of the first BSSID of the BSS associated with first WLAN device and the second WLAN device.

3. The method of claim 1, wherein the first BSS indicator is a BSS color and the second BSS indicator is a BSS color extension.

4. The method of claim 1, wherein the first BSS indicator is included in a first field of the PHY header and the second BSS indicator is included in a second field of the PHY header.

5. The method of claim 4, wherein the first field is a SIG-A field of the PHY header and the second field is a SIG-B field of the PHY header.

6. The method of claim 4, wherein the first field is a Hybrid SIG field of the PHY header and the second field is a SIG-A field or a SIG-B field of the PHY header.

7. The method of claim 1, wherein the first BSS indicator and the second BSS indicator are included in a first field of the PHY header.

8. The method of claim 7, wherein the first field is a SIG-A field, a SIG-B field, or a Hybrid SIG field of the PHY header.

9. The method of claim 7, wherein the first BSS indicator and the second BSS indicator form a single BSSID indicator included in the first field of the PHY header.

10. The method of claim 1, wherein the first BSS indicator includes a plurality of bits and the second BSS indicator includes a plurality of bits, and determining the first BSS indicator and the second BSS indicator includes one of:
determining values for the first BSS indicator and the second BSS indicator randomly,
determining values for the first BSS indicator and the second BSS indicator based on values that have not been selected by other BSSs in an overlapping BSS (OBSS), or
determining values for the first BSS indicator and the second BSS indicator using at least a portion of the first BSSID of the BSS.

11. The method of claim 1, wherein the first WLAN device is an access point (AP) and the second WLAN device is a station (STA).

12. A wireless communication device for use in a first wireless local area network (WLAN) device that supports a hybrid automatic repeat request (HARQ) protocol, comprising:
a processing system configured to:
generate a first HARQ packet for transmission to a second WLAN device, and
determine a first basic service set (BSS) indicator and a second BSS indicator for a BSS associated with the first WLAN device and the second WLAN device, the first BSS indicator and the second BSS indicator being indicative of a first BSS identifier (BSSID) of the BSS; and
a first interface configured to:
output the first HARQ packet for transmission to the second WLAN device, the first HARQ packet including the first BSS indicator and the second BSS indicator in one or more fields of a physical layer (PHY) header of the first HARQ packet, and
obtain a HARQ feedback message from the second WLAN device responsive to the first BSSID indicated by the first BSS indicator and the second BSS indicator matching a second BSSID associated with the second WLAN device.

13. The wireless communication device of claim 12, wherein a combination of the first BSS indicator and the second BSS indicator is indicative of the first BSSID of the BSS associated with first WLAN device and the second WLAN device.

14. The wireless communication device of claim 12, wherein the first BSS indicator is a BSS color and the second BSS indicator is a BSS color extension.

15. The wireless communication device of claim 12, wherein the first BSS indicator is included in a first field of the PHY header and the second BSS indicator is included in a second field of the PHY header.

16. The wireless communication device of claim 12, wherein the first BSS indicator and the second BSS indicator are included in a first field of the PHY header.

17. A method for wireless communication by a wireless communication device of a first wireless local area network (WLAN) device that supports a hybrid automatic repeat request (HARQ) protocol, comprising:
obtaining a first HARQ packet from a second WLAN device;
determining a first basic service set (BSS) indicator and a second BSS indicator included in one or more fields of a physical layer (PHY) header of the first HARQ packet;
determining a first BSSID based, at least in part, on the first BSS indicator and the second BSS indicator;
determining whether the first BSSID matches a BSSID of a BSS associated with the first WLAN device; and
processing the first HARQ packet and communicating with the second WLAN device in response to determining the first BSSID matches the BSSID of the BSS associated with the first WLAN device.

18. The method of claim 17, further comprising:
discarding the first HARQ packet in response to determining the first BSSID does not match the BSSID of the BSS associated with the first WLAN device.

19. The method of claim 17, wherein a combination of the first BSS indicator and the second BSS indicator is indicative of the BSSID of the BSS associated with first WLAN device and the second WLAN device.

20. The method of claim 17, wherein the first BSS indicator is a BSS color and the second BSS indicator is a BSS color extension.

21. The method of claim 17, wherein the first BSS indicator is included in a first field of the PHY header and the second BSS indicator is included in a second field of the PHY header.

22. The method of claim 17, further comprising:
generating a HARQ feedback message for transmission to the second WLAN device in response to determining the first BSSID matches the BSSID of the BSS associated with the first WLAN device.

23. The method of claim 17, further comprising:
determining a first station identifier (STA ID) included in the PHY header of the first HARQ packet;
determining whether the first STA ID matches a STA ID associated with the first WLAN device; and
processing the first HARQ packet and communicating with the second WLAN device in response to determining the first BSSID matches the BSSID of the BSS associated with the first WLAN device, and determining the first STA ID matches the STA ID associated with the first WLAN device.

24. A wireless communication device for use in a first wireless local area network (WLAN) device that supports a hybrid automatic repeat request (HARQ) protocol, comprising:

a first interface configured to obtain a first HARQ packet from a second WLAN device; and
a processing system configured to:
determine a first basic service set (BSS) indicator and a second BSS indicator included in one or more fields of a physical layer (PHY) header of the first HARQ packet;
determine a first BSSID based, at least in part, on the first BSS indicator and the second BSS indicator;
determine whether the first BSSID matches a BSSID of a BSS associated with the first WLAN device; and
process the first HARQ packet and communicate with the second WLAN device in response to a determination that the first BSSID matches the BSSID of the BSS associated with the first WLAN device.

25. The wireless communication device of claim 24, wherein the processing system is further configured to:
discard the first HARQ packet in response to a determination that the first BSSID does not match the BSSID of the BSS associated with the first WLAN device.

26. The wireless communication device of claim 24, wherein a combination of the first BSS indicator and the second BSS indicator is indicative of the BSSID of the BSS associated with first WLAN device and the second WLAN device.

27. The wireless communication device of claim 24, wherein the first BSS indicator is a BSS color and the second BSS indicator is a BSS color extension.

28. The wireless communication device of claim 24, wherein the first BSS indicator is included in a first field of the PHY header and the second BSS indicator is included in a second field of the PHY header.

* * * * *